US011997324B2

(12) United States Patent
Soman et al.

(10) Patent No.: US 11,997,324 B2
(45) Date of Patent: May 28, 2024

(54) SYSTEMS AND METHODS FOR DYNAMIC OPTIMIZATION OF CONTENT DELIVERY IN A WIRELESS COMMUNICATION NETWORK

(71) Applicant: NOVI DIGITAL ENTERTAINMENT PRIVATE LIMITED, Mumbai (IN)

(72) Inventors: Nikhil Soman, Mumbai (IN); Ashutosh Agrawal, Mumbai (IN)

(73) Assignee: NOVI DIGITAL ENTERTAINMENT PRIVATE LIMITED, Mumbai (IN)

( * ) Notice: Subject to any disclaimer, the term of this patent is extended or adjusted under 35 U.S.C. 154(b) by 0 days.

(21) Appl. No.: 17/754,425

(22) PCT Filed: Oct. 4, 2020

(86) PCT No.: PCT/IN2020/050854
§ 371 (c)(1),
(2) Date: Apr. 1, 2022

(87) PCT Pub. No.: WO2021/064754
PCT Pub. Date: Apr. 8, 2021

(65) Prior Publication Data
US 2022/0337888 A1    Oct. 20, 2022

(30) Foreign Application Priority Data
Oct. 4, 2019    (IN) .............................. 201921040378

(51) Int. Cl.
*H04N 21/2343* (2011.01)
*H04L 65/61* (2022.01)
(Continued)

(52) U.S. Cl.
CPC ......... *H04N 21/2343* (2013.01); *H04L 65/61* (2022.05); *H04L 65/762* (2022.05);
(Continued)

(58) Field of Classification Search
CPC ....................... H04N 21/2343; H04N 21/2393
See application file for complete search history.

(56) References Cited

U.S. PATENT DOCUMENTS

| 6,728,263 | B2 | 4/2004 | Joy et al. |
| 6,888,848 | B2 | 5/2005 | Beshai et al. |

(Continued)

FOREIGN PATENT DOCUMENTS

| CA | 2806473 C | 11/2016 |
| CN | 101753853 A | 6/2010 |

(Continued)

OTHER PUBLICATIONS

Bedogni, Luca et al., Dynamic Segment Size Selection in HTTP Based Adaptive Video Streaming, 2017 IEEE Conference on Computer Communications Workshops, pp. 665-670.
(Continued)

*Primary Examiner* — Hsiungfei Peng
(74) *Attorney, Agent, or Firm* — Kwan & Olynick LLP

(57) ABSTRACT

A system and method for dynamically optimizing content delivery in a wireless communication network. The method comprises receiving, at a transceiver [208A], a request for delivery of a content from at least one user device [202]. A manifest module [208B] determines one or more first parameters for the at least one user device [202] and compares one or more parameters of the at least one user device [202] with one or more second parameters of the at least one cohort. The manifest module [208B] dynamically identifies (or generates) a virtual manifest associated with the at least one cohort (or the at least one user device [202]) based on the comparison. A segmenter module [208C] automatically extracts a stream of data associated with the virtual manifest. The transceiver [208A] delivers the content to the at least one user device [202] based on the extracted stream of data.

21 Claims, 11 Drawing Sheets

(51) Int. Cl.
| | |
|---|---|
| *H04L 65/75* | (2022.01) |
| *H04L 65/80* | (2022.01) |
| *H04N 21/239* | (2011.01) |
| *H04N 21/24* | (2011.01) |
| *H04N 21/262* | (2011.01) |
| *H04N 21/442* | (2011.01) |
| *H04N 21/61* | (2011.01) |
| *H04N 21/6377* | (2011.01) |
| *H04N 21/845* | (2011.01) |

(52) U.S. Cl.
CPC ......... *H04L 65/80* (2013.01); *H04N 21/2393* (2013.01); *H04N 21/24* (2013.01); *H04N 21/6181* (2013.01); *H04N 21/8456* (2013.01)

(56) References Cited

U.S. PATENT DOCUMENTS

| | | | |
|---|---|---|---|
| 6,891,855 | B2 | 5/2005 | Bruckman |
| 7,894,481 | B2 | 2/2011 | Greunen et al. |
| 8,860,779 | B2 | 10/2014 | Chen et al. |
| 9,832,503 | B2 | 11/2017 | Phillips |
| 9,900,363 | B2 | 2/2018 | Nagaraj et al. |
| 9,910,919 | B2 | 3/2018 | Jin et al. |
| 10,003,860 | B2 | 6/2018 | McCarthy et al. |
| 10,476,943 | B2 | 11/2019 | Chen et al. |
| 2010/0189183 | A1 | 7/2010 | Gu et al. |
| 2011/0280241 | A1* | 11/2011 | Field .................... H04L 65/611 370/390 |
| 2012/0047542 | A1* | 2/2012 | Lewis .............. H04N 21/44016 725/97 |
| 2014/0229529 | A1* | 8/2014 | Barone ................. H04L 65/103 709/203 |
| 2014/0280906 | A1 | 9/2014 | Johns et al. |
| 2016/0140224 | A1 | 5/2016 | Jin et al. |
| 2018/0097772 | A1* | 4/2018 | Tirpak ................. H04L 65/613 |
| 2019/0069038 | A1 | 2/2019 | Phillips |
| 2019/0222618 | A1 | 7/2019 | Baccichet |
| 2020/0028931 | A1 | 1/2020 | Zhu et al. |

FOREIGN PATENT DOCUMENTS

| | | |
|---|---|---|
| CN | 104022852 B | 12/2017 |
| CN | 106899894 B | 6/2019 |
| EP | 3652951 A1 | 5/2020 |
| WO | 2015121708 A1 | 8/2015 |
| WO | 2021064754 A3 | 6/2021 |

OTHER PUBLICATIONS

Frederiksen, Frank et al., Method, Apparatus and Computer Program to Dynamically Adjust Segmentation at a Protocol Layer, Such as at the Medium Access Control (MAC) Layer, Indian Application Serial No. IN/PCT/2007/08035/DEL, filed on Oct. 17, 2007.

International Application Serial No. PCT/IN2020/050854, Search Report and Written Opinion dated May 20, 2021, 17 pages.

* cited by examiner

SYSTEMS AND METHODS FOR DYNAMIC OPTIMIZATION OF CONTENT DELIVERY IN A WIRELESS COMMUNICATION NETWORK

CROSS REFERENCE TO RELATED APPLICATIONS

This application is a national application and, pursuant to 35 U.S.C. § 371, is entitled to and claims the right of priority based on international application no. PCT/IN2020/050854 filed Oct. 4, 2020, which claims priority to Indian Patent App. No. 201921040378 filed Oct. 4, 2019, the content of which is incorporated herein by reference in its entirety for all purposes.

TECHNICAL FIELD

The present disclosure relates generally to wireless communication networks, and particularly relates to a system and method for dynamic optimization of content delivery in a wireless communication network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the overall field of the invention, and not as admissions of prior art.

The current mechanisms or techniques used for streaming media/multimedia, such as a video, over a wireless communication network, focus on providing high quality streaming of video by packing various frames of the content into various streams of different bitrates. Some streaming protocols such as HTTP or DASH, HTTP Live Streaming or HLS, HTTP Dynamic Streaming or HDS, etc. use adaptive bitrate (ABR) streaming to provide support for the creation and transmission of multiple streams of varying bitrates being renditions of the same multimedia content. As used herein, a bitrate refers to the bits which are transmitted per second. In these technologies, a high-quality media, such as a video, is always transmitted at a high bit rate as compared to a low-quality media. For example, a video encoded at a resolution of 1080p will be transmitted at a data rate ranging from 2 mbps to 13 mbps and a video encoded at a resolution of 720p will be transmitted at a rate ranging from 1.5 mbps to 3 mbps.

Conventionally, the ABR technique, in order to optimize the transfer of data, provides for the production of various frames of the same data encoded at various bit rates. That is, the ABR technique simultaneously encodes media, such as a song video, in low quality as well as high quality at various bit rates such as 1.5 mbps, 3 mbps, 4, mbps, 6 mbps, 13 mbps and so on. The player on the user device is capable of choosing the appropriate stream of media based on certain conditions such as buffer space, network conditions, etc. The encoding process in the existing streaming protocols includes transcoding, i.e. breaking down of scenes into frames. Pursuant to transcoding, the streaming process includes a packaging step wherein the frames are packed together into segments.

Typically, a segment may be of a length ranging from 0.1 seconds to N seconds. Additionally, in the ABR technique, the length of each segment is consistent across all streams of data encoded at varying bitrates to permit the user to vary the renditions in quality of media streamed due to fluctuating network conditions. FIG. 1 illustrates a prior art system of a wireless communication network used to transmit the fixed sized segments encoded at all varying bitrates which are read by a user device using a bandwidth switching mechanism, also called as ABR (Adaptive Bitrate Switching). As shown in the figure, this mechanism permits the streams of media to be encoded at varying bitrates for playback. The mechanism then provides a single stream, containing segments of equal length, of a particular bitrate to the user device depending on the network conditions, that is, that bandwidth available to transfer data to the user device. Therefore, although different streams of media are created, the user receives a single stream chosen by the ABR.

In the ABR technique, the player on the user device factors the download data rate and the playback bitrate to measure the rate and quality of audio-visual data transfer over time. Further, in order to optimize the quality of audio-visual playback, the player analyses the playback bitrate factor, that is bit rate at which the audio-visual data is received. However, since the playback bitrate is completely subjective to the scene complexity, the quality subsequent to playback computed by the player is dependent on a different scene. Further, the download of uniform length segments doesn't allow the player the advantage of building a longer buffer and a smooth playback experience. The switching of the quality by sampling, while keeping smooth playback, may also be done only when there is availability of a good amount of buffer in the player and a reasonable amount of time to sample other layers to switch quality.

Further, in the ABR switching mechanism, the playback quality is sacrificed in adverse network conditions. For instance, if the user is in a low network area, the playback quality of the media deteriorates. Also, frequent changes in the network condition results in changing of the quality of media transferred thereby increasing the chances of deterioration of the quality and buffering of the playback. Lastly, the media player at the user device is required to typically sample by fetching a segment from another layer of quality when the player seeks to change the quality of media playback. The segment sampled is first played if it downloads in time else it will be discarded, resulting in the player to remain at the same level of quality. This sampling of media segment results in an increase of buffering time. Therefore, it is apparent from the aforementioned problems and limitations, that there exists a need to provide for a mechanism that improves the volatility in the ABR technique by making the reference for ABR switching more consistent across different layers of encoding.

OBJECT OF THE INVENTION

This section is provided to introduce certain objects and aspects of the present invention in a simplified form that are further described below in the description. In order to overcome at least a few drawbacks associated with the known solutions as provided in the previous section and to improve the efficiency on the existing ABR technique, an objective of the present invention is to provide for systems and methods for dynamically optimizing delivery of content in a communication network. Another objective of the present invention is to provide for systems and methods for dynamically determining the content segment length based on the conditions of a user device. Yet another objective of the present invention is to provide for systems and methods to dynamically create a virtual manifest for media content with different segment sizes determined based on the conditions of a user device. Yet another objective of the present invention is to provide for a virtual manifest where the content segments are not be of the same duration across different layers of quality. Yet another objective of the present invention is to dynamically compose content segments during streaming. Yet another objective of the present invention is to transmit streams of audio-visual data of consistent quality. Yet another objective of the present invention is to reduce the volume of ingest in the wireless communication network/content delivery network by reducing the number of audio-visual streams required to be produced in various bitrates. Yet another objective of the present invention is to provide the production of a virtual manifest that combines content segments to address volatile user network conditions. Yet another objective of the present invention is to improve the user experience of playback while making the data consumption on the user device linear, as there would be less wastage. Yet another objective of the present invention is to improve the volatility in the ABR technique by making the reference for ABR switching more consistent across different layers of encoding. Yet another objective of the present invention is to maintain backward compatibility with existing systems such as ABR.

In order to achieve the aforementioned objectives, the present invention provides a method and system for dynamically optimizing content delivery in a wireless communication network. An aspect of the present invention relates to a method for dynamically optimizing content delivery in a wireless communication network. The method comprises receiving, at a transceiver of a content transmission server, a request for delivery of a content from at least one user device. Next, a manifest module of the content transmission server determines one or more first parameters for the at least one user device based on the received request. Further, the manifest module of the content transmission server associates the at least one user device with at least one cohort based on a comparison of the determined one or more first parameters with one or more second parameters of the at least one cohort. Next, the manifest module of the content transmission server dynamically identifies a virtual manifest associated with the at least one cohort. Subsequently, a segmenter module of the content transmission server automatically extracts a stream of data associated with the identified virtual manifest, wherein the stream of data comprises of one or more segments. Lastly, the transceiver of the content transmission server delivers the content to the at least one user device based on the extracted stream of data for dynamically optimizing content delivery in the wireless communication network.

Another aspect of the present invention relates to a method for dynamically optimizing content delivery in a wireless communication network. The method comprises receiving, at a transceiver of a content transmission server, a request for delivery of a content from at least one user device. Next, a manifest module of the content transmission server determines one or more first parameters for the at least one user device based on the received request. Further, the manifest module of the content transmission server dynamically creates a new virtual manifest for the at least one user device. Subsequently, a segmenter module of the content transmission server automatically generates a new stream of data for the requested content based on the new virtual manifest, wherein the new stream of data comprises of one or more segments. Lastly, the transceiver of the content transmission server delivers the requested content to the at least one user device based on the generated new stream of data for dynamically optimizing content delivery in the wireless communication network.

Yet another aspect of the present invention relates to a system for dynamically optimizing content delivery in a wireless communication network. The system comprises of a content transmission server further comprising a transceiver, a manifest module and a segmenter module. The transceiver of a content transmission server is configured to receive a request for delivery of a content from at least one user device. The manifest module of the content transmission server is configured to determine one or more first parameters for the at least one user device based on the received request. The manifest module of the content transmission server is configured to associate the at least one user device with at least one cohort based on a comparison of the determined one or more first parameters with one or more second parameters of the at least one cohort. The manifest module of the content transmission server is configured to dynamically identify a manifest associated with the at least one cohort. The segmenter module of the content transmission server is configured to automatically extract a stream of data associated with the identified virtual manifest, wherein the stream of data comprises of one or more segments. The transceiver of the content transmission server is further configured to deliver the content to the at least one user device based on the extracted stream of data for dynamically optimizing content delivery in the wireless communication network.

Yet another aspect of the present invention relates to a system for dynamically optimizing content delivery in a wireless communication network. The system comprises of a content transmission server further comprising a transceiver, a manifest module and a segmenter module. The transceiver of a content transmission server is configured to receive a request for delivery of a content from at least one user device. The manifest module of the content transmission server is configured to determine one or more first parameters for the at least one user device based on the received request. The manifest module of the content transmission server is further configured to dynamically create a new virtual manifest for the at least one user device. The segmenter module of the content transmission server is configured to automatically generate a new stream of data for the requested content based on the new virtual manifest, wherein the new stream of data comprises of one or more segments. The transceiver of the content transmission server is configured to deliver the requested content to the at least one user device based on the generated new stream of data for dynamically optimizing content delivery in the wireless communication network.

Yet another aspect of the present invention relates to a non-transient computer-readable medium comprising instructions for causing a computer to perform the method of receiving a request for delivery of a content from at least one user device; determining one or more first parameters for the at least one user device based on the received request; associating the at least one user device with at least one cohort based on a comparison of the determined one or more first parameters with one or more second parameters of the at least one cohort; dynamically identifying a virtual manifest associated with the at least one cohort; automatically extracting a stream of data associated with the identified virtual manifest, wherein the stream of data comprises of one or more segments; and delivering the content to the at least one user device based on the extracted stream of data for dynamically optimizing content delivery in the wireless communication network.

Yet another aspect of the present invention relates to a non-transient computer-readable medium comprising instructions for causing a computer to perform the method of receiving a request for delivery of a content from at least one user device; determining one or more first parameters for the at least one user device based on the received request; dynamically creating a new virtual manifest for the at least one user device; automatically generating a new stream of data for the requested content based on the new virtual manifest, wherein the new stream of data comprises of one or more segments; and delivering the requested content to the at least one user device based on the generated new stream of data for dynamically optimizing content delivery in the wireless communication network.

BRIEF DESCRIPTION OF THE DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
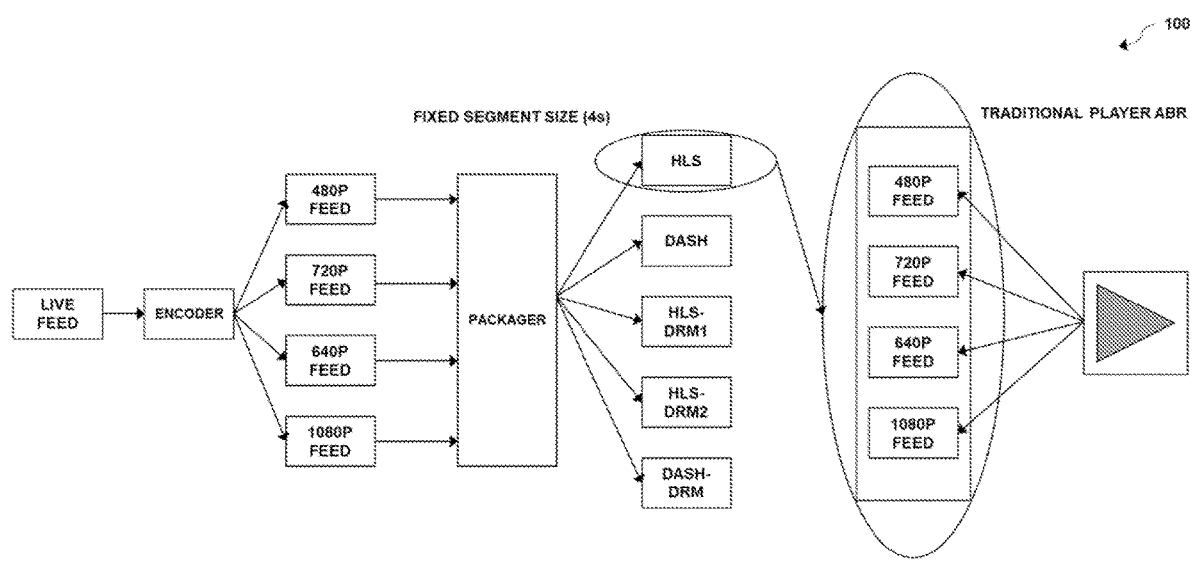
FIG. 1 illustrates an exemplary block diagram of a wireless communication network system, such as an OTT Live streaming system, for delivering content using the existing ABR streaming in the prior art.

The foregoing shall be more apparent from the following more detailed description of the invention.

DETAILED DESCRIPTION OF THE INVENTION

In the following description, for the purposes of explanation, various specific details are set forth in order to provide a thorough understanding of the embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "connect", "configure", "couple" and its cognate terms, such as "connects", "connected", "configured" and "coupled" may include a physical connection (such as a wired/wireless connection), a logical connection (such as through logical gates of semiconducting device), other suitable connections, or a combination of such connections, as may be obvious to a skilled person.

As used herein, "send", "transfer", "transmit", and their cognate terms like "sending", "sent", "transferring", "transmitting", "transferred", "transmitted", etc. include sending or transporting data or information from one unit or component to another unit or component, wherein the content may or may not be modified before or after sending, transferring, transmitting.

As used herein, "database" "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein 'computer readable media' refers to both volatile and non-volatile media, removable and non-removable media, any available medium that may be accessed by the computing device. By way of example and not limitation, computer readable media comprise computer storage media and communication media.

As used herein, a "cohort" refers to a group of one or more user devices, wherein the user devices are grouped under one cohort based on the two or more user devices sharing one or more characteristics and/or behaviors, for example, requested content, gender, age group, location, network type, bandwidth, an event, etc. The present invention encompasses that a size of cohort unit is configurable.

As used herein, a "manifest" is a log or record of all the information relating to the transfer of the audio-visual data to the user device [202] including, but not limiting to, the number of segments in a stream of data to be transferred, the size of the segments to be transferred, the links (URLs) to the segments in content delivery network, the composition of a stream of data to be transferred in at least one quality rendition.

As used herein, a "virtual manifest" is a log or record of all the information relating to the transfer of the audio-visual data to the user device [202] including, but not limiting to, the number of modified (combined) segments in a stream of data to be transferred, the size of the modified segments to be transferred, the links (URLs) to the modified segments in content delivery network, the composition of a stream of data to be transferred in at least one fail safe quality rendition.

As used herein, "expected efficiency" of the delivery of the content relates to a measure of successful delivery such that the audiovisual content is received at the user device with the same segment length and segment size determined and delivered to the user device in at least one failsafe rendition by the content transmission server. The expected efficiency is derived based on at least a historical data related to the delivery of content and a feedback received from the user devices. Further, as used herein, "predefined threshold" refers to a predetermined value of the expected efficiency of the delivery of the content to deliver a standard quality rendition of the requested that the user device is capable of display, wherein at least one of the length and size of the segments is modified based on the predetermined value of the expected efficiency.

As used herein, the "segments" in respect of an audio-visual content contain digital data relating to any type of live or pre-recorded audio/video content or program segment, including, but not limited to, recorded over-the-air free network TV shows or programs, paid TV broadcast programs, free-to-air satellite TV shows or programs, IPTV programs, etc., Over-The-Top (OTT) and video-on demand (VOD) or movie-on-demand shows or programs, as well as other content provided by publishers, owners or providers, including but not limited to online radio shows/programs, entertainment shows, educational shows, movies, music video programs, and the like. The invention encompasses that the segments may be encoded using suitable ABR streaming techniques such as HTTP Streaming (for instance, Dynamic Adaptive Streaming over HTTP or DASH, HTTP Live Streaming or HLS, HTTP Dynamic Streaming or HDS, etc.), Icecast and the like. As used herein, "scene complexity" of one or more segments refers to one or more characteristics related to a quality of an audio-visual content, for e.g., resolution, etc. The segments help in downloading a content in bits & pieces at user device for maintaining playback buffer.

As used herein, the "uniform segments" refers to one or more segments with at least one of a uniform segment length and a uniform segment size. As used herein, the "modified segments" refers to one or more segments with at least one of a modified segment length and a modified segment size. For e.g., five segments of length 1 sec each are combined into larger segments of 5 seconds if user bandwidth is good; ten segments of size 100 kb each are combined into larger segments (1 Mb) if user bandwidth is good. The present invention encompasses that the original segments received from the encoding server or CDN will not be modified directly, a copy of downloadable segments are made first (duplication happens first) then the duplicated downloaded segments are modified, (e.g. combined, thus, helping in backward compatibility.

As used herein, "content" refers to any form of data preferably audio-visual data such as a video, an image, etc. available for viewing of a user, e.g. live cricket match. As used herein, an "audio-visual content delivery session" refers to the transfer of all the segments/streams of the encoded audio-visual content to the user device using the wireless communication network, that is, an audio-visual content delivery session is the period between the transfer of the first segment of the audio-visual content and the last segment of the audio-visual content to the user device.

As used herein, "rendition" refers to a quality of a content and comprises of one or more characteristics of the content, for e.g. pixels, encoding scheme, etc. As used herein, "failsafe rendition" refers to one or more selected quality variations of a content in modified segments that works for the user device based on the 'one or more first parameters' associated with the user device or 'one or more second parameters' associated with a cohort. For example, for a user requesting for a content is determined to be in a network with 30-40 Mbps bandwidth derived from the one or more first parameters, then the failsafe renditions would be one of a 5 Mbps, 10 Mbps, 15 Mbps that the user device is capable of rendering.

As used herein, "target failsafe rendition" refers to one or more lower quality variations of a content (not selected for the fail safe rendition) in segments/modified segments that works for a given scene complexity (quality) and efficiency of delivery, such that the user device is capable of efficiently receiving content during the time of change in the scene complexity. For example, if user is in 30-40 Mbps bandwidth, then if the expected efficiency of failsafe renditions of 5 Mbps, 10 Mbps or 15 Mbps are below a threshold, then a target failsafe rendition is chosen from one of the failsafe renditions (5 Mbps, 10 Mbps or 15 Mbps) based on the one or more first parameters.

As used herein, "encoder" refers to a hardware unit configured to encode the content for transmission. The encoding may be done using any known using suitable encoding technique such as Alternate Bitrate Streaming (ABR) technique and HTTP Streaming for instance, Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, a live cricket match to be streamed on the user device may be encoded using the DASH encoding technique for ABR streaming by the encoder As used herein, "content delivery network" refers to an overlay network architected for high-performance streaming of audio-visual data to users using one or more Internet based infrastructures, private/dedicated infrastructures or a combination thereof.

Hereinafter, exemplary embodiments of the present disclosure will be described in detail with reference to the accompanying drawings so that those skilled in the art can easily carry out the present disclosure.

As also discussed above, in the ABR technique, the player on the user device factors the download data rate and the playback bitrate to measure the rate and quality of audio-visual data transfer. Since the playback bitrate is completely subjective to the scene complexity, the quality subsequent to playback computed by the player is dependent on a different scene. Download of uniform length (or uniform size) segments doesn't allow the player the advantage of building a longer buffer and a smooth playback experience. Thus, the playback quality is sacrificed in adverse network conditions. Moreover, frequent changes in the network condition result in changing of the quality of media transferred thereby increasing the chances of buffering/deterioration of the quality. Furthermore, the media player at the user device is required to typically sample by fetching a segment from another layer of quality when the player seeks to change the quality of media playback. The segment sampled is first played if it downloads in time else it will be discarded, resulting in the player to remain at the same level of quality. This sampling of media segment results in an increase of buffering time.

The present invention provides solution to the above mentioned problem of the current system by providing a system and a method for dynamically optimizing content delivery in a wireless communication network. The solution of the present invention improves the volatility in the ABR technique by making the reference for ABR switching more consistent across different layers of encoding. Also, the solution of the present invention produces virtual manifests where the segments need not be of the same duration across different layers of quality. The solution of the present invention also provides for dynamically composing segments during streaming, thus, improving the quality of playback while making the data consumption on the user device linear, as there would be less wastage.

The present invention provides a method and system for dynamic optimization of content delivery in a wireless communication network. The present invention encompasses that a content encoding server encodes an audio-visual content in one or more bitrates. The content is encoded in segments of a uniform small size, or a uniform small length by the encoder. At runtime, a user device transmits a request to play the audio-visual content, on a media player on the user device, said request being transmitted to a content transmission server using a wireless communication network. The user device also transmits one or more parameters (including but not limited to user device identifier, playback buffer size, playback buffer time, user's network type, bandwidth, location, etc.) to the content transmission server. Upon receipt of the request along with the one or more parameters, the content transmission server receives the encoded audio-visual content from the content encoding server in uniform segments. The content transmission server then determines at least one fail safe rendition of the audio-visual content, modifies the uniform segments into variable length larger segments, dynamically generates a virtual manifest with the modified segments for the content delivery session based on the received one or more parameters. The streams of modified segment audio-visual data are then ingested into the wireless communication network by the content transmission server for transmission to the user device. The user device then receives the modified segments based on virtual manifest developed by the content transmission server for audio-visual playback on the user device in at least one fail safe rendition.

Figure 2:
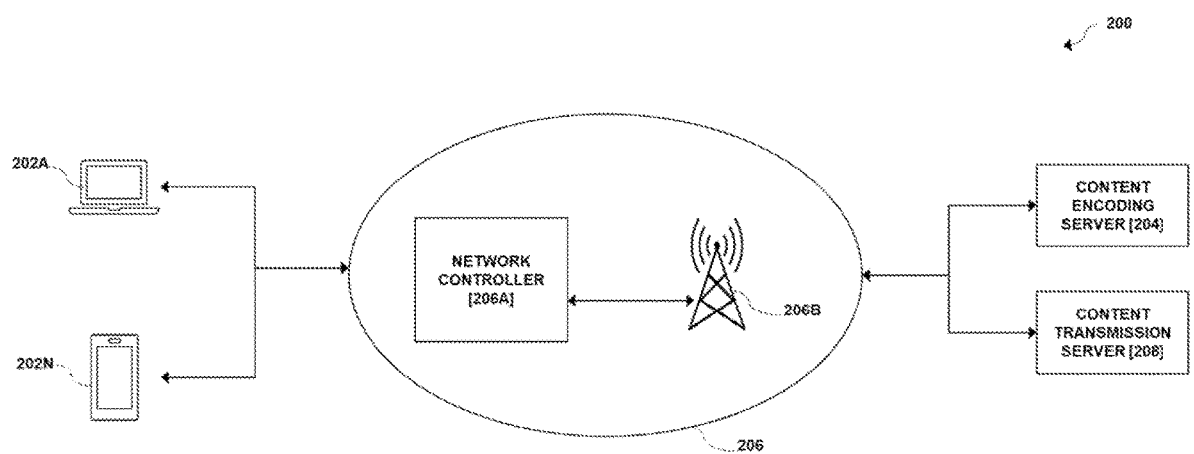
FIG. 2 illustrates an exemplary block diagram of a wireless communication network system providing for dynamic optimization of delivery of content, in accordance with exemplary embodiments of the present invention.

Referring to FIG. 2, an exemplary block diagram of a wireless communication network system providing for dynamic optimization of delivery of content, is disclosed in accordance with exemplary embodiments of the present invention. The wireless communication network system for providing for dynamic optimization of delivery of content [200] comprises of at least one user device [202A . . . 202N], a content encoding server [204], a wireless communication network [206] and a content transmission server [208]. As used herein in this disclosure, the user devices [202A . . . 202N] may be collectively referred to as user device [202] without limiting the scope of the present disclosure. The wireless communication network [206] further comprises of a network controller [206A] and a base station [206B]. Although only a limited number of user devices [202A . . . 202N], content encoding server [204], content transmission server [208], network controller [206A] and base station [206B] are shown with reference to FIG. 1, however, it will be appreciated by those skilled in the art that the invention encompasses use of multiple such units.

The user device [202A . . . 202N, hereinafter collectively referred to as 202] is configured to receive streamed/delivered content over a wireless communication network [206]. In an embodiment, the user device [202] may receive various types of audio-visual content via a streaming session over a suitable wireless connection to the wireless communication network [206] which supports streaming of audio-visual sessions. The user device [202] is also configured to include a media player to send a request to play an audio-visual content. The user device [202] is also configured to play the streamed audio-visual content on the media player on the user device [202]. As used herein, the "user device [202]" refers to any electrical, electronic, electromechanical and computing device. The user device [202] may include, but not limited to, a mobile phone, a tablet, a smartphone, a laptop, a wearable device, a tablet, e-reader, a phablet, a personal digital assistant and any such device obvious to a person skilled in the art.

The content encoding server [204] is configured to encode the audio-visual content into various bitrates. As used herein, the content encoding server [204] may be a centralized server or a decentralized server connected via a wireless or wired communication network. The content is encoded uniform segments in plurality of renditions for an audio-visual content delivery session.

For example, a content of high resolution of 1080p can be encoded into various bitrates simultaneously such as a segment at 3 mbps and at 6 mbps in segments of uniform 'length of 1 sec' or 'size of 100 kb'. The same content can also be encoded at a low quality of 720p into various bitrates simultaneously such as a segment at 1.5 mbps and at 4 mbps in segments of uniform 'length of 1 sec' or 'size of 100 kb'. The encoded segments are ingested into a content delivery network (not shown in FIG. 2) through a wireless communication network [206] for streaming on the user device [202].

The content transmission server [208] is configured to receive a request from the user device [202] to play an audio-visual content on a media player on the user device [202]. As used herein, the content transmission server [208] may be a centralized server or a decentralized server connected via a wireless or wired communication network. The content transmission server [208] is further configured to receive the one or more first parameters from the user device [202]. As used herein, a "first parameters" may comprise of the information about the user device [202] to which the audio-visual content is being transmitted, the bit rate at which the segments are being transmitted, the time taken by the playback buffer to download a single segment, the segment size in respect of all segments of the an audio-visual content delivery session, the size of the data in every segment, a network type (for example, network is a cellular network, e.g. 3G, 4G, 5G, or a Wi-Fi network), the playback buffer information of the user device [102]. In an embodiment, the one or more first parameters is dynamically received by the content transmission server [208].

Further, the content transmission server [208] is configured to dynamically create a virtual manifest for the audio-visual content delivery session. The content transmission server [208] is also configured to dynamically create a virtual manifest for each user device [202] based on the one or more first parameters of the user device [202], wherein the virtual manifest provides for formation of segments of varying length in at least one fail safe rendition. The content transmission server [208] is further configured to transfer the segments to the user device [202] based on the dynamically generated manifest.

In an embodiment, the invention encompasses that the content transmission server [208] is configured to receive the one or more first parameters of the user device [202] at periodic intervals. The content transmission server [208] may further be configured to receive the one or more first parameters of the user device [202] only when a change/update in the one or more first parameters is detected within an audio-visual content delivery session. For example, the content transmission server [208] may receive the one or more first parameters of the user device [202] after the transfer of every 10 segments. In an example, the content transmission server [208] may receive the one or more first parameters of the user device [202] when there is a change/update in network conditions of the user device [202] within the audio-visual content delivery session. For instance, the content transmission server [208] may only receive the one or more first parameters of the user device [202] when the user device [202] enters a low-bandwidth area from a high bandwidth area within the audio-visual content delivery session.

The wireless communication network [206] may be any wireless communication network capable to transfer data packets between entities of that network such as a carrier network including but not limited to circuit switched network, a public switched network, a LTE network, a 4G network, a GSM network, a 5G network, a Wi-Fi network, and a UMTS network. As shown in the FIG. 2, the wireless communication network [206] comprises of the network controller [206A] and the base station [206B].

The present invention encompasses that the wireless communication network [206] may comprise "multiple services network elements" that provide support for multiple network-based functions such as session control, Quality of Service (QoS) enforcement, bandwidth scheduling management, subscriber management, etc. along with support for multiple application services. The present invention encompasses the user device [202] may access the audio-visual content provided over a content delivery network [206] via a suitable wireless connection in accordance with the present invention. Further, the user device [202] may also access the audio-visual content provided over broadcast networks as well as a packet switched wide area public network such as the Internet via suitable service provider access networks or virtual private networks (VPNs) overlaid on the Internet.

The present invention encompasses that the user device [202] may be configured to receive audio-visual content via streaming sessions effectuated over a suitable wireless connection. The streaming sessions may at least partly involve delivery of the audio-visual content via a delivery network such as CDN coupled to the wireless communication network [206] serving the user device [202]. The CDN may comprise an overlay network architected for high-performance streaming of audio-visual data to users using one or more Internet based infrastructures, private/dedicated infrastructures or a combination thereof.

The network controller [206A] in the wireless communication network [106], coupled to the base station [206B], is configured to provide logical and control functions relative to, e.g., roaming support and/or terminal mobility management, subscriber account management, as well as accessing of external networks or communication entities and delivery of streamed content from one or more content sources such as the content delivery server [204]. For example, connectivity to other networks or infrastructures such as, for instance, the Internet, the CDN and circuit switched landline telephone network (i.e., a Public-Switched Telephone Network or PSTN). In case of an LTE carrier network, network controller [206A] may include functionalities of an Access Gateway (AG) or an Evolved Packet Core (EPC) node. The invention encompasses that the network controller [206A] and the base station [206B] may be configured to facilitate, in conjunction with or independent of one or more external network entities and databases, the delivery of audio-visual content in accordance with the present invention.

The base station [206B], connected to the network controller [206A], is configured to provide a radio interface in the form of suitable links between the user device [202] and the network controller [206A] via appropriate transmitting elements. As used herein, the base station [206B] may comprise a base station [206B] in a Third Generation (3G) network when the wireless communication network is a Third Generation Partnership Projects (3GPP) Long Term Evolution (LTE) network. In an embodiment, the base station [206B] may include a controller (not shown), an access point (AP) (not shown), a radio tower (not shown), or any other type of radio interface device capable of operating in a wireless communication network system [206]. Additionally, base station [206B] may be part of an Access Network (AN) (not shown), wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like.

Figure 3:
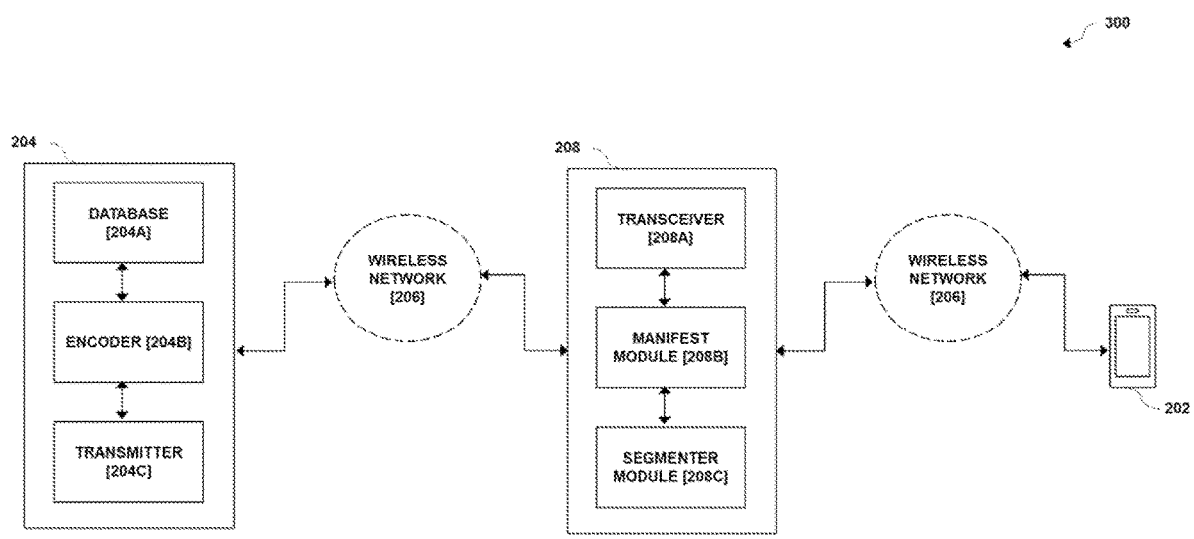
FIG. 3 illustrates an exemplary diagram of the overall architecture comprising of the content encoding server and the content transmission server for dynamic optimization of delivery of content, in accordance with exemplary embodiments of the present invention.

Referring to FIG. 3, an overall architecture [300] of the content encoding server [204] and the content transmission server [208] for dynamic optimization of delivery of content, is depicted in accordance with a first embodiment of the present invention. As shown in FIG. 3, the content encoding server [204] is connected to the content transmission server [208] over the wireless network [206] and the content transmission server [208] is further connected to the user device [202]. Although the invention shown in the figure comprises of one content encoding server [204] and a content transmission server [208], the scope of the invention encompasses that one or more components of the content encoding server [204] and the content transmission server [208] shown in the figure may be in one or more servers, wherein the servers are a decentralized server comprising of two or more servers. The invention also encompasses that one or more components of the content encoding server [204] and the content transmission server [208] may be connected to each other via the wireless communication network [206]. The invention also encompasses that the content encoding server [204] and content transmission server [208] may be a single server without departing from the scope of the invention. Furthermore, although only one user device [202] is shown in the FIG. 3, it will be appreciated by those skilled in the art that this is for illustrative purposes only and the content transmission server [208] is capable of providing content to multiple user devices [202] simultaneously.

As shown in the figure, the content encoding server [204] may comprise of a database [204A], an encoder [204B] and a transmitter [204C]. The database [204A] is configured to store the data of all the audio-visual content that may be streamed on a user device [202]. The database [204A] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The encoder [204B], connected to the database [204A], is configured to retrieve the data of the audio-visual content from the database [204A] and encode the content for transmission. The encoding may be done using any known using suitable encoding technique such as Adaptive Bitrate Streaming (ABR) technique and HTTP Streaming for instance, Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, a live cricket match to be streamed on the user device [202] may be encoded using the DASH encoding technique for ABR streaming by the encoder [204B].

The invention encompasses that the audio-visual content may be encoded in a specific quality in one or more bitrate by the encoder [204B]. For example, a content of high resolution of 1080p can be encoded into various bitrates simultaneously such as a segment at 3 mbps and at 6 mbps. The same content can also be encoded at a low quality of 720p into various bitrates simultaneously such as a segment at 1.5 mbps and at 4 mbps. The invention further encompasses that the audio-visual content may be encoded in a specific quality by the encoder [204B] when the audio-visual content is of a particular complexity. In an embodiment, the audio-visual content may be encoded in a low quality if the complexity of data is less. For example, audio-visual content containing content of low complexity, such as a content of a news channel, may be encoded at the resolution of 720p only. Such a data may then only be encoded at bitrates of 3 mbps.

Further, the encoder [204B] is configured to form segments of the audio-visual content. The invention encompasses that the encoder [204B] is configured to create uniform segments of encoded content which can be combined to form a stream of audio-visual content that is transferred to the user device [202]. For example, all the segments created by the encoder [204B] may be of length 1 second. In another example, the encoder [204B] may create the segments of the encoded data of length 2 seconds each by combining two uniform length segments of 1 second. The invention encompasses that the encoder [204B] is configured to form uniform segments corresponding to at least one or more bitrate. For example, a segment length of 1 second may correspond to audio-visual data encoded at a low quality of bitrate at 1.5 mbps and another data encoded at bitrate 4 mbps. Simultaneously, the segment length of 1 second may also correspond to audio-visual data encoded at a high quality of bitrate at 3 mbps and another data encoded at bitrate 6 mbps. The invention encompasses that the encoder [204B] is further configured to transmit the uniform segments of the encoded audio-visual data to the transmitter [204C].

The transmitter [204C] is configured to receive encoded uniform segments formed by the encoder [204B]. The transmitter [204C] is configured to transmit the encoded uniform segments to the content transmission server [208]. The transmitter [204C] is also configured to transmit the encoded uniform segments to a content delivery network (not shown in FIG. 3). In a preferred embodiment, the transmitter [204C] may transmit the encoded uniform segments via a wireless communication network [206] only after receiving a request to receive such content from the content transmission server [208]. In a further embodiment, the transmitter [204C] may transmit the encoded uniform segments to content transmission server [208] directly before ingesting the content to the content delivery network. In a yet further embodiment, the transmitter [204C] may transmit the encoded uniform segments to the content delivery network directly, and the content transmission server [208] retrieves the content from the content delivery network.

Further, as depicted in the figure, the content transmission server [208] may comprise of a transceiver [208A], a manifest module [208B] and a segmenter module [208C]. The transceiver [208A] is configured to receive a request from the user device [202] to play an audio-visual content. For example, a request from a user device [202] may be received to play a particular movie.

The invention encompasses that the transceiver [208A] in response to the request received from the user device [202] sends a request to the content encoding server [204] or content delivery network (not shown in FIG. 3). The transceiver [208A] is also configured to receive the encoded uniform size segments from the content encoding server [204]. Alternatively, the transceiver [208A] receives the encoded uniform segments from the content delivery network. The transceiver [208A] is also configured to transmit the encoded uniform size segments to the segmenter module [208C]. For example, the transceiver [208A] may receive 1 second segments of an encoded movie from the content encoding server [204] or content delivery network. The transceiver [208A] then transfers the 1 second segments of the encoded movie to the segmenter module [208C]. The transceiver [208A] is also configured to receive the one or more first parameters from the user device [202]. The transceiver [208A] may then transfer the one or more first parameters received from the user device [202] to the manifest module [208B].

The transceiver [208A] is also configured to receive one or more first parameters of user device. The one or more first parameters include but not limited to a user device identifier, a playback buffer size, a playback buffer time, a network type (for example, network is a cellular network, e.g. 3G, 4G, 5G, or a Wi-Fi network), a bandwidth and a location of the at least one user device [202]. The transceiver [208A] is also configured to send the one or more received parameters to the manifest module [208B].

The manifest module [208B], connected to the transceiver [208A] and segmenter module [208C], is configured to dynamically generate a virtual manifest for the transfer of audio-visual data to the user device [202]. The present invention encompasses that the manifest module [208B] is configured to dynamically create a virtual manifest for each user device [202] for an audio-visual content delivery session based on the one or more first parameters of the user device [202]. The manifest module [208B] is further configured to transmit the dynamically created virtual manifest to the user device [202] via the wireless communication network [206].

The invention further encompasses that the virtual manifest is dynamically generated for each audio-visual session and can be updated in real-time. The manifest module [208B] is also configured to dynamically update the virtual manifest based on any change in the one or more first parameters received from the user device [202]. The manifest module [208B] determines at least one fail safe rendition of the user requested content from the one or more first parameters and dynamically creates a virtual manifest based on the at least one fail safe renditions. The virtual manifest with failsafe renditions is then shared with the user device for playback of the user requested content. The invention encompasses that a stream of an audio-visual data may be created in the virtual manifest by the manifest module [208B].

The present invention further encompasses that the manifest module [208B] is configured to associate the at least one user device [202] with at least one cohort based on a comparison of the determined one or more first parameters with one or more second parameters of the at least one cohort. Accordingly, the manifest module [208B] is configured to dynamically identify a manifest associated with the at least one cohort. In another instance, the manifest module [208B] is configured to identify one or more failsafe renditions, wherein the one or more failsafe renditions is determined based on the one or more second parameters.

In yet another instance, the manifest module [208B] is configured to automatically detect a scene complexity of the requested content and determine at least one of a target segment length and a target segment size for the one or more segments based on one of the detected scene complexity. The manifest module [208B] is further configured to determine an expected efficiency of delivery of the content with modified at least one of the target segment length and the target segment size, based on at least one of the one or more first parameters and the one or more second parameters.

The present invention further encompasses that the manifest module [208B] of the content transmission server [208] is further configured to dynamically monitor the one or more first parameters of the at least one user device [202].

The segmenter module [208C], connected to the manifest module [208B], is configured to create the streams of data for transfer to the user device [202]. The segmenter module [208C] is configured to receive the uniform segments of content from the encoder [204B] of the content encoding server [204] encoded at different bitrates and create the streams of the audio-visual data based on the virtual manifest created by the manifest module [208B]. The segmenter module [208C] of the content transmission server [208] dynamically modifies at least one of a segment length and a segment size for the one or more segments based on the determined the target segment length and the target segment size, in an event the expected efficiency is above a pre-defined threshold. The transceiver [208A] delivers the content to the at least one user device [202] based on the modification of at least one of the segment length and the segment size of the one or more segments. In another instance, the segmenter module [208C] is configured to automatically modify at least one of a segment length and a segment size for the one or more segments based on a change in the one or more first parameters, wherein the content is delivered to the at least one user device [202] based on the modification of the at least one of the segment length and the segment size of the one or more segments. The segmenter module [208C] is configured to receive the encoded uniform segments from the encoder [204B] of the content encoding server [204] via the transceiver [208A]. The segmenter module [208C] is configured to combine uniform size segments formed by the encoder [204B], to form longer segments of the audio-visual content basis the virtual manifest. The longer segments may then form the stream of audio-visual data. For example, the segmenter module [208C] provide for combining 4 segments of uniform size of 1 second, to form a larger segment of 4 seconds, if the one or more first parameters of the user device [202] indicates that the user device [202] is in a good wireless network connection area. The larger segments may then be virtually listed to be sent as a single stream of data to be transmitted to the user device [202] or may be listed to be a part of a larger stream of data to be transmitted to the user device [202] in the manifest created by the manifest module [208B]. The segmenter module [208C] is further configured to ingest the longer segments created into the wireless communication network [206] via the transceiver [208A] for playback on the user device [202], as further explained in the ensuing paragraphs.

As depicted, the segmenter module [208C] may be connected to the encoder [204B] via the wireless communication network [206]. In another embodiment, the segmenter module [208C] may be connected to the encoder [204B] and the transmitter [204C] via the wireless communication network [206]. The transmitter [204C] of the content encoding server [204] is configured to transfer the encoded uniform segments to the transceiver [208A] of the content transmission server [208] via the wireless communication network [206]. The invention encompasses that the segmenter module [208C] is configured to dynamically create a single stream of each audio-visual data, wherein each stream contains segments of audio-visual data of at least one fail safe rendition. The segmenter module [208C] is also configured to dynamically update the streams of audio-visual data based on the updated manifest created by the manifest module [208B] in real-time to the user device.

The present invention encompasses that the segmenter module [208C] of the content transmission server [208] is further configured to automatically extract the stream of data associated with the identified virtual manifest based on the one or more failsafe renditions. In an instance, the segmenter module [208C] of the content transmission server [208] is also configured to extract a stream of data associated with at least one target failsafe rendition from the one or more renditions, in an event the expected efficiency is below a pre-defined threshold, wherein the transceiver [208A] of the content transmission server [208] delivers the content to the at least one user device [202] based on the at least one target failsafe rendition. In operation, the stream of data associated with the at least one target failsafe rendition is extracted by the segmenter module [208C] during the time period of the complex scene, and the segmenter module [208C] falls back to extracting the stream associated with other failsafe renditions based on one of the cohort and the scene complexity duration for maintaining the consistency in quality to user.

The transceiver [208A] is also configured to transmit the audio-visual content for playback to the user device [202]. The invention encompasses that the audio-visual content may be transmitted to the user device [202] in the form of modified segments containing the playback audio-visual content. The transceiver [208A] is configured to receive the segments forming the stream of the audio-visual content from the segmenter module [208C]. The transceiver [208A] is then configured to ingest the segments from the segmenter module [208C] into the wireless communication network [206] for streaming on the user device [202]. For example, the movie requested by the user may be ingested into the wireless communication network [206] by the transceiver [208B] as segments containing the playback content for streaming on the media player on the user device [202]. In an embodiment, the transceiver [208A] is also configured to transmit the virtual manifest created to the user device [202]. In another instance, the transceiver [208A] is also configured to deliver the content to the at least one user device [202] based on the at least one target failsafe rendition.

Figure 4:
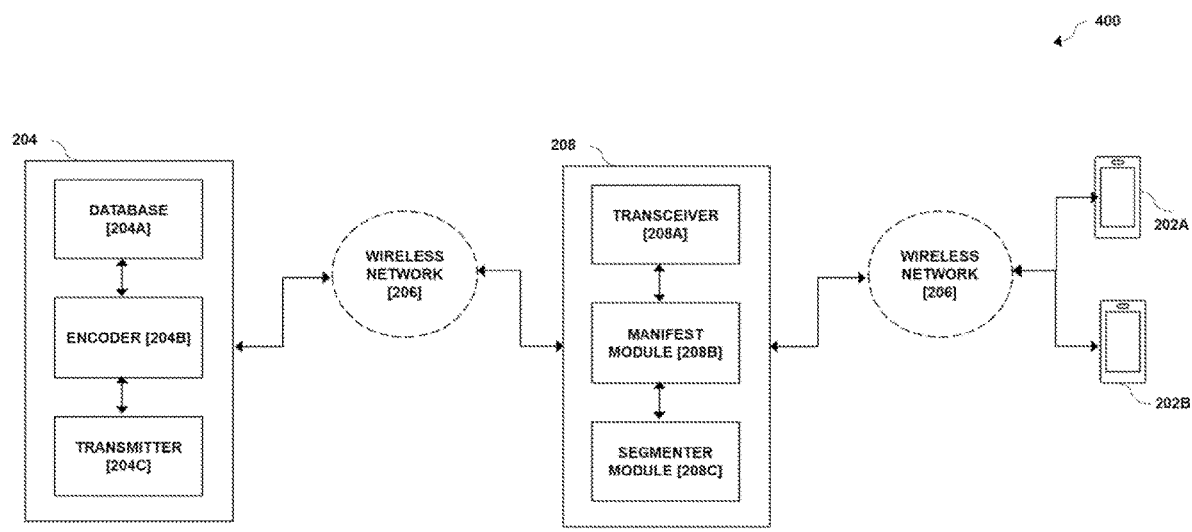
FIG. 4 illustrates another exemplary diagram of the overall architecture comprising of the content encoding server and the content transmission server for dynamic optimization of delivery of content, in accordance with exemplary embodiments of the present invention.

Upon receiving the virtual manifest, the media player [202D] in user device [202] fetches the modified segments, and downloads the modified segments form the CDN and plays for user. In effect, the downloading of the modified segments happens in the background continuously while user is watching the content to maintain playback buffer Referring to FIG. 4, an overall architecture [300] of the content encoding server [204] and the content transmission server [208] for dynamic optimization of delivery of content, is depicted in accordance with a second embodiment of the present invention. As shown in FIG. 4, the content encoding server [204] is connected to the content transmission server [208] over the wireless network [206] and the content transmission server [208] is further connected to the user device [202A, 202B, collectively referred to as 202]. Although the invention shown in the figure comprises of one content encoding server [204] and a content transmission server [208], the scope of the invention encompasses that one or more components of the content encoding server [204] and the content transmission server [208] shown in the figure may be in one or more servers, wherein the servers are a decentralized server comprising of two or more servers. The invention also encompasses that one or more components of the content encoding server [204] and the content transmission server [208] may be connected to each other via the wireless communication network [206]. The invention also encompasses that the content encoding server [204] and content transmission server [208] may be a single server without departing from the scope of the invention. Furthermore, although only two user devices [202A, 202B] are shown in the FIG. 4, it will be appreciated by those skilled in the art that this is for illustrative purposes only and the content transmission server [208] is capable of providing content to multiple user devices [202] simultaneously.

As shown in the figure, the content encoding server [204] may comprise of a database [204A], an encoder [204B] and a transmitter [204C]. The database [204A] is configured to store the data of all the audio-visual content that may be streamed on a user device [202]. The database [204A] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

The encoder [204B], connected to the database [204A], is configured to retrieve the data of the audio-visual content from the database [204A] and encode the content for transmission. The encoding may be done using any known using suitable encoding technique such as Adaptive Bitrate Streaming (ABR) technique and HTTP Streaming for instance, Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, a live cricket match to be streamed on the at least one user device [202] may be encoded using the DASH encoding technique for ABR streaming by the encoder [204B].

The invention encompasses that the audio-visual content may be encoded in a specific quality in one or more bitrate by the encoder [204B]. For example, a content of high resolution of 1080p can be encoded into various bitrates simultaneously such as a segment at 3 mbps and at 6 mbps. The same content can also be encoded at a low quality of 720p into various bitrates simultaneously such as a segment at 1.5 mbps and at 4 mbps. The invention further encompasses that the audio-visual content may be encoded in a specific quality by the encoder [204B] when the audio-visual content is of a particular complexity. In an embodiment, the audio-visual content may be encoded in a low quality if the complexity of data is less. For example, audio-visual content containing content of low complexity, such as a content of a news channel, may be encoded at the resolution of 720p only. Such a data may then only be encoded at bitrates of 3 mbps.

Further, the encoder [204B] is configured to form segments of the audio-visual content. The invention encompasses that the encoder [204B] is configured to create segments of uniform size which can be combined to form a stream of audio-visual content that is transferred to the at least one user device [202]. In effect, this feature of the present invention ensures maintaining a backward compatibility. For example, all the segments created by the encoder [204B] may be of length 1 second. In another example, the encoder [204B] may create all the segments of the encoded data of length 2 seconds. The invention encompasses that the encoder [204B] is configured to form segments of uniform size corresponding to at least one or more bitrate. For example, a segment length of 1 second may correspond to audio-visual data encoded at a low quality of bitrate at 1.5 mbps and another data encoded at bitrate 4 mbps. Simultaneously, the segment length of 1 second may also correspond to audio-visual data encoded at a high quality of bitrate at 3 mbps and another data encoded at bitrate 6 mbps. The invention encompasses that the encoder [204B] is further configured to transmit the uniform size segments of the encoded audio-visual data to the transmitter [204C].

The transmitter [204C] is configured to receive encoded uniform size segments formed by the encoder [204B]. The transmitter [204A] is also configured to transmit the encoded uniform size segments to the content transmission server [208]. In a preferred embodiment, the transmitter [204A] may transmit the encoded uniform size segments via a wireless communication network [206] only after receiving a request to receive such content from the content transmission server [208].

Further, as depicted in the figure, the content transmission server [208] may comprise of a transceiver [208A], a manifest module [208B] and a segmenter module [208C]. The transceiver [208A] is configured to receive a request from the at least one user device [202] to play an audio-visual content. For example, a request from at least one user device [202A] may be received to play a particular movie.

The invention encompasses that the transceiver [208A] in response to the request received from the at least one user device [202] sends a request to the content encoding server [204]. The transceiver [208A] is also configured to receive the encoded uniform size segments from the content encoding server [204]. The transceiver [208A] is also configured to transmit the encoded uniform size segments to the segmenter module [208C]. For example, the transceiver [208A] may receive 1 second segments of an encoded movie from the content encoding server [204]. The transceiver [208A] then transfers the 1 second segments of the encoded movie to the segmenter module [208C]. The transceiver [208A] is also configured to receive the one or more first parameters from the at least one user device [202A] as well as the at least one other user device [202B]. The transceiver [208A] may then transfer the one or more first parameters received from the at least one user device [202] to the manifest module [208B].

The manifest module [208B], connected to the transceiver [208A] and segmenter module [208C], is configured to dynamically generate a virtual manifest for the transfer of audio-visual data to the at least one user device [202]. The invention encompasses that the manifest module [208B] is configured to dynamically create a virtual custom manifest for each user device [202] for an audio-visual content delivery session based on the one or more first parameters of the user device [202]. The manifest module [208B] is further configured to transmit the dynamically created virtual manifest to the user device [202] via the wireless communication network [206].

The invention further encompasses that the virtual manifest is dynamically generated for each audio-visual session and can be updated in real-time. The manifest module [208B] is also configured to dynamically update the virtual manifest based on any change in the one or more first parameters received from the user device [202]. The segmenter module [208C] dynamically virtually provides for combining the uniform size segments to form a uniform stream of data to be streamed at the user device [202]. In one embodiment, the segmenter module [208C] may only virtually provide for combining the uniform size segments encoded at a particular bit rate to form a stream of data to be transferred. In another embodiment, the segmenter module [208C] may virtually provide for combining the uniform size segments encoded at different bit rates to form a stream of data to be transferred. The invention encompasses that a stream of an audio-visual data may be created in the virtual manifest by the manifest module [208B].

The invention encompasses that the segmenter module [208C] is also configured to dynamically and virtually provide for combining the segments of uniform size to form a larger segment of data to be transferred. The uniform size segments may be combined to form a larger segment of audio-visual data based on the one or more first parameters of the user device [202]. For example, the segmenter module [208C] may virtually provide for combining 4 segments of uniform size of 1 second, to form a larger segment of 4 seconds, if the one or more first parameters of the user device [202] indicates that the user device [202] is in a good wireless network connection area. The larger segments may then be virtually listed to be sent as a single stream of data to be transmitted to the user device [202] or may be listed to be a part of a larger stream of data to be transmitted to the user device [202] in the manifest created by the manifest module [208B].

The present invention further encompasses that the manifest module [208B] is configured to determine one or more first parameters for the at least one user device [202A] based on the received request. Accordingly, the manifest module [208B] is configured to dynamically create a new virtual manifest for the at least one user device [202A]. In this regard the present invention further encompasses that the manifest module [208B] is configured to compare the determined one or more first parameters of the at least one user device [202A] with one or more second parameters of at least one cohort, wherein the new cohort is created for the at least one user device [202A] based on the comparison. In another instance, the manifest module [208B] is configured to identify one or more failsafe renditions, wherein the one or more failsafe renditions is determined based on the one or more second parameters. The manifest module [208B] is configured to create the new virtual manifest for the at least one user device [202A] in an event the one or more first parameters of the at least one user device [202A] does not match the one or more second parameters of the at least one cohort. The manifest module [208B] of the content transmission server [208] is further configured to determine a segment length and a segment size of the one or more segments based on the one or more first parameters.

The manifest module [208B] of the content transmission server [208] is further configured to determine one or more failsafe renditions for the new virtual manifest, wherein the one or more failsafe renditions is determined based on the one or more first parameters. In another instance, the manifest module [208B] of the content transmission server [208] is further configured to automatically detect a scene complexity of the requested content, wherein the segmenter module [208C] of the content transmission server [208] dynamically modify at least one of the segment length and the segment size for the one or more segments based on one of the detected scene complexity and the one or more failsafe renditions, wherein the content is delivered to the at least one user device [202A] based on the modification of the at least one of the segment length and the segment size of the one or more segments In yet another instance, the manifest module [208B] is configured to automatically detect a scene complexity of the requested content and determine at least one of a target segment length and a target segment size for the one or more segments based on one of the detected scene complexity. The manifest module [208B] is further configured to determine an expected efficiency of delivery of the content with modified at least one of the target segment length and the target segment size, based on at least one of the one or more first parameters and the one or more second parameters.

The manifest module [208B] is further configured to determine one or more first parameters for the at least one other user device [202B] based on the received request from the at least one other user device [202B]. Further, the manifest module [208B] is configured to compare the determined one or more first parameters of the at least one other user device [202B] with one or more first parameters of at least one user device [202A]. It then dynamically creates a new cohort for the at least one user device [202A] and at least one other user device [202B] based on the comparison. For instance, the manifest module [208B] creates a new cohort for the at least one user device [202A] and at least one other user device [202B] in an event the determined one or more first parameters of the at least one other user device [202B] matches with one or more first parameters of at least one user device [202A]. The manifest module [208B] dynamically identifies the new virtual manifest associated with the at least one user device [202].

The present invention further encompasses that the manifest module [208B] of the content transmission server [208] is further configured to automatically detect a scene complexity of the requested content by the at least one other user device [202B]. The manifest module [208B] of the content transmission server [208] also determines at least one of a target segment length and a target segment size for the one or more segments based on one of the detected scene complexity. The manifest module [208B] of the content transmission server [208] determines an expected efficiency of delivery of the content with modified at least one of the target segment length and the target segment size, based on the first parameters of the at least one other user device [202] and the first parameters of the at least one user device [202].

The segmenter module [208C], connected to the manifest module [208B], is configured to create the streams of data for transfer to the user device [202]. The segmenter module [208C] is configured to receive the uniform size segments from the encoder [204B] of the content encoding server [204] encoded at different bitrates and create the streams of the audio-visual data based on the virtual manifest created by the manifest module [208B]. The segmenter module [208C] is configured to receive the encoded uniform size segments from the encoder [204B] of the content encoding server [204] via the transceiver [208A]. The segmenter module [208C] is configured to combine uniform size segments formed by the encoder [204B], to form longer segments of the audio-visual content. The longer segments may then form the stream of audio-visual data. The segmenter module [208C] is further configured to ingest the longer segments created into the wireless communication network [206] via the transceiver [208A] for playback on the user device [202], as further explained in the ensuing paragraphs.

As depicted, the segmenter module [208C] may be connected to the encoder [204B] via the wireless communication network [206]. In another embodiment, the segmenter module [208C] may be connected to the encoder [204B] and the transmitter [204C] via the wireless communication network [206]. The transmitter [204C] of the content encoding server [204] is configured to transfer the encoded uniform size segments to the transceiver [208A] of the content transmission server [208] via the wireless communication network [206]. The invention encompasses that the segmenter module [208C] is configured to dynamically create a single stream of each audio-visual data, wherein each stream contains segments of audio-visual data. The segmenter module [208C] is also configured to dynamically update the streams of audio-visual data based on the updated manifest created by the manifest module [208B] in real-time.

The present invention encompasses that the segmenter module [208C] of the content transmission server [208] is further configured to automatically generate a new stream of data for the requested content based on the new virtual manifest, wherein the new stream of data comprises of one or more segments. The segmenter module [208C] of the content transmission server [208] is further configured to automatically generate the new stream of data for the requested content based on at least one of the segment length and the segment size determined by the manifest module [208B].

The segmenter module [208C] of the content transmission server [208] is further configured to automatically generate the new stream of data for the requested content based on the one or more failsafe renditions. In an instance, the segmenter module [208C] of the content transmission server [208] is also configured to extract a stream of data associated with at least one target failsafe rendition of the one or more renditions, in an event the expected efficiency is below a pre-defined threshold, wherein the transceiver [208A] of the content transmission server [208] delivers the content to the at least one user device [202A] based on the at least one target failsafe rendition.

The segmenter module [208C] of the content transmission server [208] is further configured to dynamically modify at least one of a segment length and a segment size for the one or more segments based on the determined the target segment length and the target segment size, in an event the expected efficiency is above a pre-defined threshold. The transceiver [208A] delivers the content to the at least one user device [202] based on the modification of at least one of the segment length and the segment size of the one or more segments. In another instance, the segmenter module [208C] of the content transmission server [208] dynamically modifies at least one of the segment length and the segment size for the one or more segments based on the determined the target segment length and the target segment size, in an event the expected efficiency is above a pre-defined threshold.

The transceiver [208A] is also configured to transmit the audio-visual content for playback to the at least one user device [202]. The invention encompasses that the audio-visual content may be transmitted to the user device [202] in the form of segments containing the playback audio-visual content. The transceiver [208A] is configured to receive the segments forming the stream of the audio-visual content from the segmenter module [208C]. The transceiver [208A] is then configured to ingest the segments from the segmenter module [208C] into the wireless communication network [206] for streaming on the user device [202]. For example, the movie requested by the user may be ingested into the wireless communication network [206] by the transceiver [208B] as segments containing the playback content for streaming on the media player on the at least one user device [202]. In an embodiment, the transceiver [208A] is also configured to transmit the virtual manifest created to the at least one user device [202]. In another instance, the transceiver [208A] is also configured to deliver the content to the at least one user device [202] based on the at least one target failsafe rendition.

Figure 5:
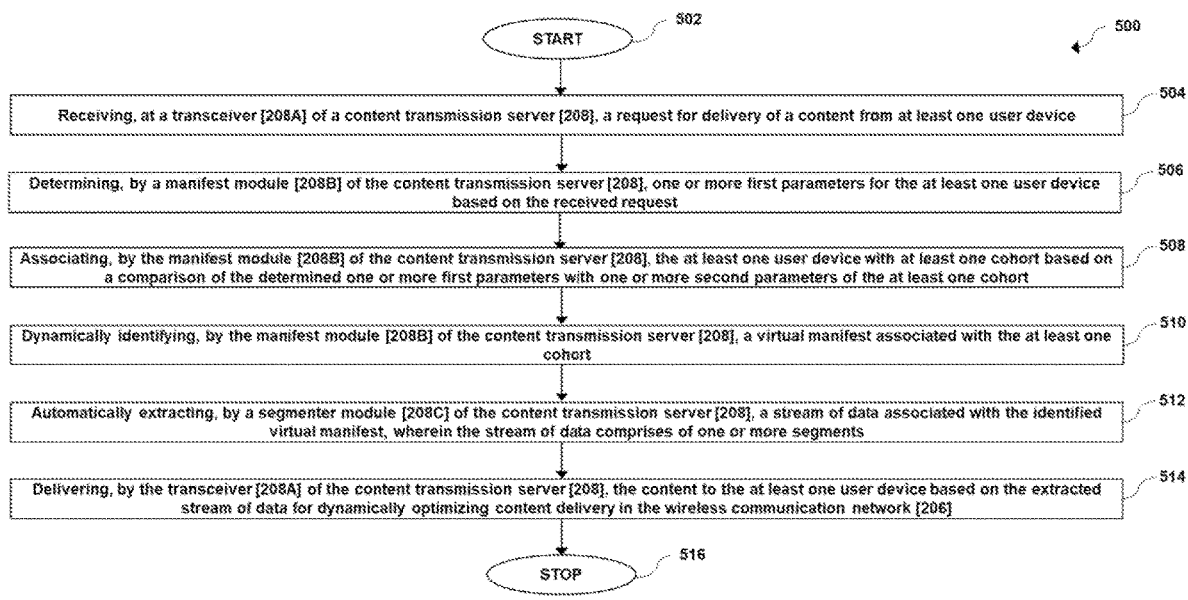
FIG. 5 illustrates an exemplary flow chart depicting a method for dynamic optimization of delivery of content in a wireless communication network system, in accordance with exemplary embodiments of the present invention.

Referring to FIG. 5 illustrates a method flow diagram for the method of dynamically optimizing content delivery in a wireless communication network in accordance with a first embodiment of the present invention. The method starts at step [502]. In an instance, the present invention encompasses that the method [500] is initiated upon a user of at least one user device [202] requesting delivery of content from a content transmission server [208]. For example, at runtime, the at least one user device [202] transmits a request to play an audio-visual content on a media player on the at least one user device [202], said request being transmitted to the content transmission server [208] using a wireless communication network. As used herein, the media player [202D] may be an application on the user device [202] which is capable to support streaming of audio-visual content from a content transmission server [208] and play it on the user device [202] in response to a request from the user. For example, the user may select the option "play" or click on a play icon to start the streaming of a live cricket match on a media player [202D], such as a live streaming application. The invention encompasses that the selection of live streaming application may be received as a user input by the input unit [202F] of the user device [202]. The user input may refer to, but not limited to, a voice command, an input received through gesture control on the user device [202], and type commands received through I/O interfaces of the user device [202]. The invention further encompasses that the selection of the option to playback an audio-visual content on a media player [202D] on the user device [202] is considered as receiving a request from the user. For instance, when a user opens a media player [202D] on the user device [202] and initiates playback request by selecting an option to play the live cricket match, such selection may be considered as a user request to playback the audio-visual content. Accordingly, at step [504], the transceiver [208A] of the content transmission server [208] receives a request for delivery of a content from at least one user device [202]. The request is received at the transceiver [208A] of the content transmission server [208] via the wireless communication network [206] using the user device [202] transceiver [202G].

The present invention further encompasses that the request for delivery of content further comprises of one or more first parameters including but not limited to a user device identifier, a playback buffer size, a playback buffer time, a network type (for example, network is a cellular network, e.g. 3G, 4G, 5G, or a Wi-Fi network), a bandwidth and a location of the at least one user device [202]. In another instance, the present invention encompasses that the one or more first parameter further comprises of at least one of a quality of streaming, a status of streaming an audio-visual content, a type of the content requested by the at least one user device [202], a playback time, a content ID (for e.g., content viewed such as Movie ID, Season ID, Series ID, Game ID, Match ID and Song ID, the advertisement ID, etc.), information about the at least one user device [202] including but not limited to model number, IMEI number and the like, the bit rate at which the audio-visual content is streamed, the time taken by the at least one user device [202] to download the audio-visual content, the number of applications on the at least one user device [202], the operating system of the at least one user device [202], the type of applications on the at least one user device [202], etc.

Next, at step [506], the manifest module [208B] of the content transmission server [208] determines the one or more first parameters for the at least one user device [202] based on the received request. The manifest module [208B] of the content transmission server [208] extracts the one or more first parameters from the received request. For example, the manifest module [208B] of the content transmission server [208] extracts at least one of the user device identifier, the playback buffer size, the playback buffer time, the bandwidth and the location of the at least one user device [202] from each of the at least one request received at the transceiver [208A] of the content transmission.

Subsequently, at step [508], upon successfully determining the one more first parameters, the manifest module [208B] of the content transmission server [208] associates the at least one user device [202] with at least one cohort based a comparison of the determined one or more first parameters with one or more second parameters of the at least one cohort. The present invention further encompasses that the one or more second parameters associated with a cohort comprises at least one of the playback buffer size, the playback buffer time, the bandwidth, the location of the at least one cohort and the user device identifier of the at least one user device [202] associated with the at least one cohort.

For instance, as illustrated in Table 1 below, there are three existing cohorts, Cohort A, Cohort B and Cohort C with their respective ranges of bandwidth and resolution of the content that is delivered to the users of the cohort. Say, a user device [202] operating on a bandwidth of 25 Mbps transmits a request for content to the content transmission server [208], the manifest module [208B] of the content transmission server [208], compares the bandwidth of the user device [202] with the bandwidth of the existing cohorts. The manifest module [208B] of the content transmission server [208] determines that the bandwidth of the user device [202] matches the bandwidth of the Cohort B, and accordingly associates the user device [202] with the Cohort B. While the above example has been explained using one parameter of the cohort, e.g. bandwidth, it shall be appreciated by a person skilled in the art that the manifest module [208B] of the content transmission server [208] can compare one or more first and second parameters to associate the user device [202] with the existing cohorts.

TABLE 1

| Cohort Serial No. | Bandwidth | Resolution |
|---|---|---|
| Cohort A | 40-30 Mbps | 4 k |
| Cohort B | 10-30 Mbps | 1080 p |
| Cohort C | 5-10 Mbps | 720 p |

Further, at step [510], the manifest module [208B] of the content transmission server [208] dynamically identifies a manifest associated with the at least one cohort. In this regard, the present invention encompasses that a manifest is created for each of the at least one cohort. Accordingly, upon associating the at least one user device [202] with the at least one cohort, the manifest module [208B] of the content transmission server [208] identifies the manifest associated with the at least one associated cohort and extends the identified virtual manifest to the at least one user device [202].

Furthermore, at step [512], a segmenter module [208C] of the content transmission server [208] automatically extracts a stream of data associated with the identified virtual manifest. In this regard, the present invention encompasses that the segmenter module [208C] of the content transmission server [208] creates a stream of data based on the manifest created by the manifest module [208B] of the content transmission server [208]. In another instance, the present invention encompasses that the segmenter module [208C] of the content transmission server [208] identifies and extracts a stream based on the virtual manifest associate with the cohort, wherein the stream is already associated with the cohort. The stream of data comprises of one or more segments, e.g., streams of comprising audio-visual data segments. The present invention further encompasses that the segmenter module [208C] dynamically updates the streams of audio-visual data based on the updated manifest created by the manifest module [208B] in real-time.

Lastly, at step [514], the transceiver [208A] of the content transmission server [208] delivers the content to the at least one user device [202] based on the extracted stream of data for dynamically optimizing content delivery in the wireless communication network. The stream of audio-visual data extracted by the segmenter module [208C], based on the dynamically generated virtual manifest, are transmitted to the at least one user device [202] for playback. The streams of data comprising of larger segments (modified segments) formed by the segmenter module [208C], based on the virtual manifest, are transmitted to the at least one user device [202]. The segments are ingested into the wireless communication network [206] for playback on the at least one user device [202] by the segmenter module [208C] via the transceiver [208A]. The segments are received by the at least user device [202] and stored in the playback buffer [202C] for playback. The audio-visual data can then be viewed on the media player [202D]. The method completes at step [516]. Resultantly, delivering the content to the at least one user device [202] based on the extracted stream of data also reduces the volume of ingest in the wireless communication network [206] by reducing the number of audio-visual streams required to be produced at various bitrates.

The method [500] further encompasses that the encoder [204B] of the content encoding server [204] is configured to encode the audio-visual data for transmission over the wireless communication network [206]. The encoding may be done using any known suitable encoding technique such as Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, the movie to be streamed on the user device [202] may be encoded using the HLS encoding technique for ABR streaming. The present invention further encompasses that the audio-visual content may be encoded in a specific quality in one or more bitrate by the encoder [204B]. For example, the encoder [204B] of the content encoding server [204] is configured to encode the audio-visual content of the live cricket match at one or more bitrates. For example, a segment of the live cricket match may be encoded at a high resolution of 1080p into various bitrates simultaneously such as a segment at 3 mbps and at 6 mbps. The same segment of the live cricket match can also be encoded at a low quality of 720p into various bitrates simultaneously such as a segment at 1.5 mbps and at 4 mbps. Thus, while in an instance all the steps of the method depicted in FIG. 5 may occur sequentially, however, the steps of encoding are independent of the user requesting playback of audio-visual content.

The present invention further encompasses that the dynamically identifying a manifest associated with the at least one cohort by the manifest module [208B] of the content transmission server [208] further comprises identifying one or more failsafe renditions, wherein the one or more failsafe renditions is determined based on the one or more second parameters. For example, in table 1, the user device [202] of the Cohort A may have at least two failsafe rendition, being, segment length and segment size associated with 1080 p and 720 p audiovisual data, such that even if a user device [202] from the Cohort A isn't able to receive 4 k data, the manifest module [208B] of the content transmission server [208] determines that the user device [202] is capable of receiving one of the 1080 p and 720 p audiovisual data. Next, the segmenter module [208C] of the content transmission server [208] automatically extracts a stream of data associated with the identified virtual manifest based on the one or more failsafe renditions. In the previous example, the segmenter module [208C] of the content transmission server [208] accordingly provides 1080p or 720p data to the user device [202] from Cohort A.

The present invention further encompasses that the method [500] further comprises dynamically monitoring, by the manifest module [208B] of the content transmission server [208], one or more first parameters of the at least one user device [202]. In this regard, the present invention encompasses that the one or more first parameters of the at least one user device [202] is dynamically received by the content transmission server [208] from the at least one user device [202]. In another embodiment, the invention encompasses that the one or more first parameters of the at least one user device [202] is received by the content transmission server [208] at periodic intervals. In yet another embodiment, the one or more first parameters of the at least one user device [202] may be received only when a change in the one or more first parameters is detected within an audio-visual content delivery session. For example, the one or more first parameters of the at least one user device [202] may be dynamically received by the content transmission server [208] after the transfer of every 100 segments of the audio-visual session. In another example, the one or more first parameters of the at least one user device [202] may be dynamically received by the content transmission server [208] only when the user device [202] [102] has entered a low network area from a high network area within the audio-visual content delivery session.

The method further comprises that the segmenter module [208C] of the content transmission server [208] automatically modifies at least one of a segment length and a segment size for the one or more segments based on a change in the one or more first parameters, wherein the content is delivered to the at least one user device [202] based on the modification of the at least one of the segment length and the segment size of the one or more segments. The present invention encompasses that the virtual manifest may also dynamically and virtually provide for combining the segments of uniform size to form a larger segment of data to be transferred. For example, a stream of audio-visual data may be generated by the segmenter module [208C] based on the virtual manifest created providing for combining segments [N, N+1, N+2] of 1 second length each encoded at a bitrate of 4 mbps and another stream may be created comprising of segments [N, N+1] wherein the segment [N] of data encoded at 1.5 mbps is followed by a segment [N+1] encoded at 13 mbps by the segmenter module [208C]. For example, 4 segments of uniform size 1 second, may be virtually combined by the manifest module [208B] to form a larger segment of 4 seconds, if the one or more parameters of the at least one user device [202] indicates that the at least one user device [202] is in a good wireless network connection area.

In another instance, a stream of audio-visual data may be generated by the segmenter module [208C] based on the virtual manifest created providing for combining segments [N, N+1, N+2] of 1 MB size each encoded at a bitrate of 4 mbps and another stream may be created comprising of segments [N, N+1] wherein the segment [N] of data encoded at 1.5 mbps is followed by a segment [N+1] encoded at 13 mbps by the segmenter module [208C]. For example, four segments of uniform size 1 MB may be virtually combined by the segmenter module [208C] to form a larger segment of 4 MB, if the one or more parameters of the at least one user device [202] indicates that the at least one user device [202] is in a good wireless network connection area. Thus, the method of the present invention ensures maintaining a consistency in quality of the content delivered to the user device [202] by dynamically modifying at least one of the segment length and the segment size based on the user device parameter, network parameter and scene complexity. Effectively, the dynamic modification of at least one of the segment length and the segment size is performed at the server content transmission server [208] itself so that a viewer watching the content on the medial player of the user device [202] doesn't experience any inconsistency in content quality.

The present invention also encompasses a non-transient computer-readable medium comprising instructions for causing a computer to perform the method of receiving a request for delivery of a content from at least one user device [202]; determining one or more first parameters for the at least one user device [202] based on the received request; associating the at least one user device [202] with at least one cohort based on a comparison of the determined one or more first parameters with one or more second parameters of the at least one cohort; dynamically identifying a virtual manifest associated with the at least one cohort; automatically extracting a stream of data associated with the identified virtual manifest, wherein the stream of data comprises of one or more segments; and delivering the content to the at least one user device [202] based on the extracted stream of data for dynamically optimizing content delivery in the wireless communication network [206].

Figure 6:
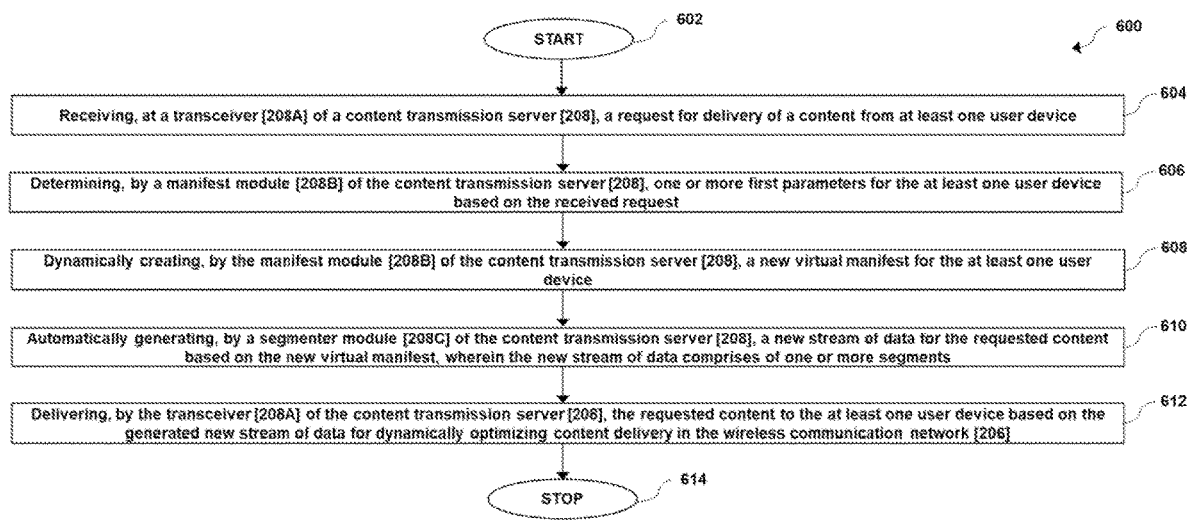
FIG. 6 illustrates another exemplary flow chart depicting a method for dynamic optimization of delivery of content in a wireless communication network system, in accordance with exemplary embodiments of the present invention.

Referring to FIG. 6 illustrates a method flow diagram for the method of dynamically optimizing content delivery in a wireless communication network in accordance with a second embodiment of the present invention. The method starts at step [602]. In an instance, the present invention encompasses that the method [600] is initiated upon a user of at least one user device [202] requesting delivery of content from a content transmission server [208]. For example, at runtime, the at least one user device [202] transmits a request to play an audio-visual content on a media player on the at least one user device [202], said request being transmitted to the content transmission server [208] using a wireless communication network. For example, the user may select the option "play" or click on a play icon to start the streaming of a live cricket match on a media player [202D], such as a live streaming application. The invention further encompasses that the selection of the option to playback an audio-visual content on a media player [202D] on the user device [202] is considered as receiving a request from the user. Accordingly, at step [604], the transceiver [208A] of the content transmission server [208] receives a request for delivery of a content from the at least one user device [202] via the wireless communication network [206].

The present invention further encompasses that the request for delivery of content further comprises of one or more first parameters including but not limited to a user device identifier, a playback buffer size, a playback buffer time, a network type (for example, network is a cellular network, e.g. 3G, 4G, 5G, or a Wi-Fi network), a bandwidth and a location of the at least one user device [202]. In another instance, the present invention encompasses that the one or more first parameter further comprises of at least one of a quality of streaming, a status of streaming an audio-visual content, a type of the content requested by the at least one user device [202], a playback time, a content ID (for e.g., content viewed such as Movie ID, Season ID, Series ID, Game ID, Match ID and Song ID, the advertisement ID, etc.), information about the at least one user device [202] including but not limited to model number, IMEI number and the like, the bit rate at which the audio-visual content is streamed, the time taken by the at least one user device [202] to download the audio-visual content, the number of applications on the at least one user device [202], the operating system of the at least one user device [202], the type of applications on the at least one user device [202], etc.

Next, at step [606], the manifest module [208B] of the content transmission server [208] determines the one or more first parameters for the at least one user device [202] based on the received request. The manifest module [208B] of the content transmission server [208] extracts the one or more first parameters from the received request. For example, the manifest module [208B] of the content transmission server [208] extracts at least one of the user device identifier, the playback buffer size, the playback buffer time, the bandwidth and the location of the at least one user device [202] from each of the at least one request received at the transceiver [208A] of the content transmission.

Subsequently, at step [608], upon successfully determining the one more first parameters, the manifest module [208B] of the content transmission server [208] dynamically creates a new virtual manifest based on the one or more first parameters. The present invention encompasses that the manifest module [208B] of the content transmission server [208] creates the new virtual manifest for the at least one user device [202] in an event the one or more first parameters of the at least one user device [202] does not match the one or more second parameters of the at least one cohort. The present invention further encompasses that dynamically creating the new virtual manifest for the at least one user device [202] by the manifest module [208B] of the content transmission server [208] further comprises determining at least one of a segment length and a segment size of the one or more segments based on the one or more first parameters. Accordingly, the new virtual manifest created is associated with a new cohort.

Furthermore, at step [610], a segmenter module [208C] of the content transmission server [208] automatically generating a new stream of data associated with the identified virtual manifest. In this regard, the present invention encompasses that the segmenter module [208C] of the content transmission server [208] creates a stream of data based on the manifest created by the manifest module [208B] of the content transmission server [208]. The segmenter module [208C] of the content transmission server [208] automatically generates the new stream of data for the requested content based on the determined at least one of the segment length and the segment size. The stream of data comprises of one or more segments, e.g., streams of comprising of audio-visual data segments. The present invention further encompasses that the segmenter module [208C] dynamically updates the streams of audio-visual data based on the updated manifest created by the manifest module [208B] in real-time.

Lastly, at step [612], the transceiver [208A] of the content transmission server [208] delivers the content to the at least one user device [202] based on the generated new stream of data for dynamically optimizing content delivery in the wireless communication network. The stream of audio-visual data generated by the segmenter module [208C], based on the dynamically generated virtual manifest, are transmitted to the at least one user device [202] for playback. The streams of data comprising of larger segments (modified segments) formed by the segmenter module [208C], based on the virtual manifest, are transmitted to the at least one user device [202]. The segments are ingested into the wireless communication network [206] for playback on the at least one user device [202] by the segmenter module [208C] via the transceiver [208A]. The segments are received by the at least user device [202] and stored in the playback buffer [202C] for playback. The audio-visual data can then be viewed on the media player [202D]. The method completes at step [614]. Resultantly, delivering the content to the at least one user device [202] based on the extracted stream of data also reduces the volume of ingest in the wireless communication network [206] by reducing the number of audio-visual streams required to be produced at various bitrates.

The method at step [608] further comprises that upon successfully determining the one more first parameters the manifest module [208B] of the content transmission server [208] compares the determined one or more parameters of the at least one user device [202] with one or more second parameters of at least one cohort, wherein the new virtual manifest is created for the at least one user device [202A] based on the comparison. For instance, as illustrated in Table 1 below, there are three existing cohorts, Cohort A, Cohort B and Cohort C with their respective ranges of bandwidth and resolution of the content that is delivered to the users of the cohort. Say, a user device [202] operating on a bandwidth of 42 Mbps transmits a request for content to the content transmission server [208], the manifest module [208B] of the content transmission server [208], compares the bandwidth of the user device [202] with the bandwidth of the existing cohorts. Say, upon not finding a cohort in Table 1 with bandwidth 42 Mbps, the manifest module [208B] of the content transmission server [208] creates a new Cohort D and a new virtual manifest for the Cohort D.

TABLE 1

| Cohort Serial No. | Bandwidth | Resolution |
|---|---|---|
| Cohort A | 40-30 Mbps | 4 k |
| Cohort B | 10-30 Mbps | 1080 p |
| Cohort C | 5-10 Mbps | 720 p |

The method [600] further encompasses that the encoder [204B] of the content encoding server [204] is configured to encode the audio-visual data for transmission over the wireless communication network [206]. The encoding may be done using any known suitable encoding technique such as Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, the movie to be streamed on the user device [202] may be encoded using the HLS encoding technique for ABR streaming. The present invention further encompasses that the audio-visual content may be encoded in a specific quality in one or more bitrate by the encoder [204B]. Thus, while in an instance all the steps of the method depicted in FIG. 6 may occur sequentially, however, the steps of encoding are independent of the user requesting playback of audio-visual content.

The present invention further encompasses that dynamically creating the new virtual manifest based on the determined one or more first parameters further comprises determining one or more failsafe renditions for the new virtual manifest, wherein the one or more failsafe renditions is determined based on the one or more first parameters. For example, in table 1, the user device [202] of the new Cohort D may have at least three failsafe rendition, being, segment length and segment size associated with 4 k, 1080 p and 720 p audiovisual data, such that even if a user device [202] from the Cohort A isn't able to receive data at 42 Mbps, the manifest module [208B] of the content transmission server [208] determines that the user device [202] is capable of receiving one of the 4 k, 1080p and 720p audiovisual data. Next, the segmenter module [208C] of the content transmission server [208] automatically generates a stream of data associated with the identified virtual manifest based on the one or more failsafe renditions. In the previous example, the segmenter module [208C] of the content transmission server [208] accordingly provides 4 k or 1080p or 720p data to the user device [202] from Cohort A.

The present invention further encompasses that the method [600] further comprises dynamically monitoring, by the manifest module [208B] of the content transmission server [208], one or more first parameters of the at least one user device [202]. In this regard, the present invention encompasses that the one or more first parameters of the at least one user device [202] is dynamically received by the content transmission server [208] from the at least one user device [202]. In another embodiment, the invention encompasses that the one or more first parameters of the at least one user device [202] is received by the content transmission server [208] at periodic intervals. In yet another embodiment, the one or more first parameters of the at least one user device [202] may be received only when a change in the one or more first parameters is detected within an audio-visual content delivery session. For example, the one or more first parameters of the at least one user device [202] may be dynamically received by the content transmission server [208] after the transfer of every 100 segments of the audio-visual session. In another example, the one or more first parameters of the at least one user device [202] may be dynamically received by the content transmission server [208] only when the user device [202] has entered a low network area from a high network area within the audio-visual content delivery session.

The method further comprises that the segmenter module [208C] of the content transmission server [208] automatically modifies at least one of a segment length and a segment size for the one or more segments based on a change in the one or more first parameters, wherein the content is delivered to the at least one user device [202] based on the modification of the at least one of the segment length and the segment size of the one or more segments. The present invention encompasses that the manifest may also dynamically and virtually provide for combining the segments of uniform size to form a larger segment of data to be transferred. For example, a stream of audio-visual data may be generated by the segmenter module [208C] based on the virtual manifest created providing for combining segments [N, N+1, N+2] of 1 second length each encoded at a bitrate of 4 mbps and another stream may be created comprising of segments [N, N+1] wherein the segment [N] of data encoded at 1.5 mbps is followed by a segment [N+1] encoded at 13 mbps by the segmenter module [208C]. For example, 4 segments of uniform size 1 second, may be virtually combined by the manifest module [208B] to form a larger segment of 4 seconds, if the one or more parameters of the at least one user device [202] indicates that the at least one user device [202] is in a good wireless network connection area.

The method [600] further comprises receiving, at a transceiver [208A] of a content transmission server [208], a second request for delivery of a content from at least one other user device [202]. Next, the manifest module [208B] of the content transmission server [208] determines the one or more first parameters for the at least one other user device [202] based on the received second request. Further, the manifest module [208B] of the content transmission server [208] compares the determined one or more first parameters of the at least one other user device [202] with the one or more first parameters of the at least one user device [202]. Subsequently, the manifest module [208B] of the content transmission server [208] dynamically creates a new cohort for the at least one user device [202] and at least one other user device [202] based on the comparison. Next, the manifest module [208B] of the content transmission server [208] dynamically identifies the new virtual manifest associated with the at least one user device [202]. Further, the segmenter module [208C] of the content transmission server [208] automatically generates a new stream of data for the requested content based on the new virtual manifest, wherein the new stream of data comprises of one or more modified segments. Lastly, the transceiver [208A] of the content transmission server [208] delivers the requested content to the at least one other user device [202] based on the generated new stream of data for dynamically optimizing content delivery in the wireless communication network [206].

The method [600] further comprises automatically detecting, by the manifest module [208B] of the content transmission server [208], a scene complexity of the requested content. Next, the segmenter module [208C] of the content transmission server [208] dynamically modifies at least one of the segment length and the segment size for the one or more segments based on one of the detected scene complexity and the one or more failsafe renditions, wherein the content is delivered to the at least one user device [202] based on the modification of the at least one of the segment length and the segment size of the one or more segments. Thus, the method of the present invention ensures maintaining a consistency in quality of the content delivered to the user device [202] by dynamically modifying at least one of the segment length and the segment size based on the user device parameter, network parameter and scene complexity. Effectively, the dynamic modification of at least one of the segment length and the segment size is performed at the server content transmission server [208] itself so that a viewer watching the content on the medial player of the user device [202] doesn't experience any inconsistency in content quality.

The present invention also encompasses a non-transient computer-readable medium comprising instructions for causing a computer to perform the method of receiving a request for delivery of a content from at least one user device [202]; determining one or more first parameters for the at least one user device [202] based on the received request;

dynamically creating a new virtual manifest for the at least one user device [202]; automatically generating a new stream of data for the requested content based on the new virtual manifest, wherein the new stream of data comprises of one or more segments; and delivering the requested content to the at least one user device [202] based on the generated new stream of data for dynamically optimizing content delivery in the wireless communication network [206].

Figure 7:
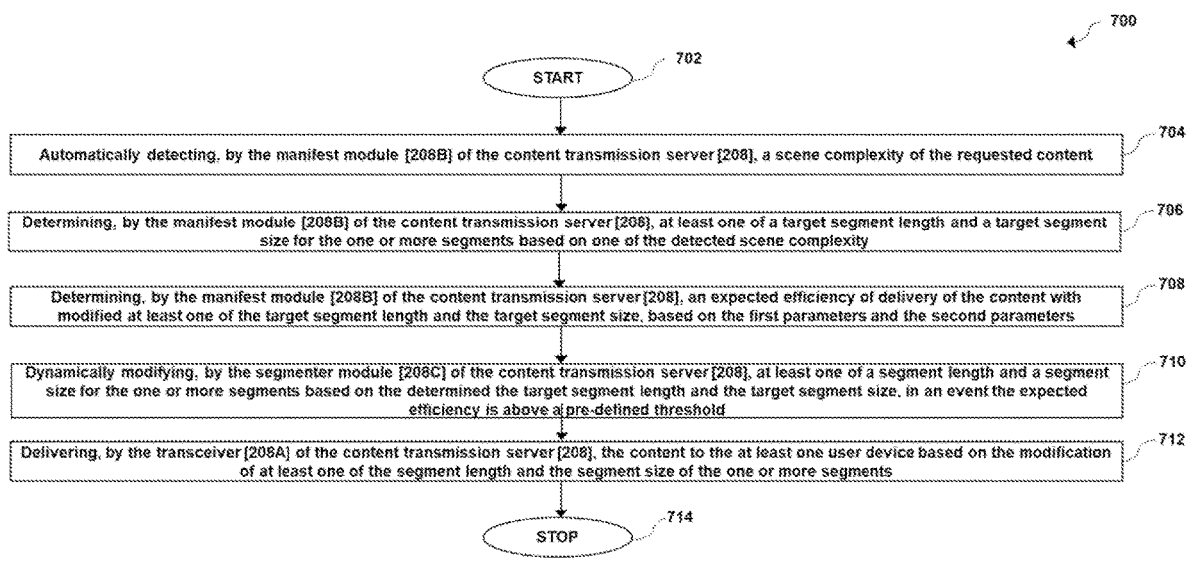
FIG. 7 illustrates an exemplary flow chart depicting a method for dynamic optimization of delivery of content in a wireless communication network system based on a detected scene complexity of the requested content, in accordance with exemplary embodiments of the present invention.

Referring to FIG. 7 illustrates an exemplary flow chart depicting a method for dynamic optimization of delivery of content in a wireless communication network system based on a detected scene complexity of the requested content, in accordance with the first embodiment of the present invention. The method [700] is a feature of the method [500] further comprising, at step [704], automatically detecting, by the manifest module [208B] of the content transmission server [208], a scene complexity of the requested content. Next, at step [706], the manifest module [208B] of the content transmission server [208] determines at least one of the target segment length and the target segment size for the one or more segments based on one of the detected scene complexity.

Further, at step [708], the manifest module [208B] of the content transmission server [208] determines an expected efficiency of delivery of the content with modified at least one of the target segment length and the target segment size, based on the first parameters and the second parameters. At step [710], the segmenter module [208C] of the content transmission server [208] dynamically modifies at least one of the segment length and the segment size for the one or more segments based on the determined the target segment length and the target segment size, in an event the expected efficiency is above a pre-defined threshold. At step [712], the manifest module [208B] of the content transmission server [208] delivers the content to the at least one user device [202] based on the modification of at least one of the segment length and the segment size of the one or more segments. The method [700] completes at step [714].

The method [700] further comprises extracting, by the segmenter module [208C] of the content transmission server [208], a stream of data associated with at least one target failsafe rendition of the one or more fail-safe renditions, in an event the expected efficiency is below a pre-defined threshold. The transceiver [208A] of the content transmission server [208] delivers the content to the at least one user device [202] based on the at least one target failsafe rendition.

In an exemplary embodiment, the manifest module [208B] may dynamically and virtually create a manifest to combine segments of length 1 second encoded at particular low bit rate such as, 3 mbps, to form larger segment for 5 seconds. This segment may contain audio-visual data of low complexity. The manifest module [208B] may then dynamically and virtually provide to combine the next segments of length 1 second encoded at high bit rate such as, 13 mbps, to form larger segment for 3 seconds based on the manifest. This segment may contain audio-visual data of high complexity. Accordingly, the segmenter module [208C] combines segments of length 1 second encoded at 3 mbps, to form larger segment for 5 seconds containing low complexity data. Thereafter, the segmenter module [208C] then forms the next subsequent segment by combining segments of length 1 second encoded at 13 mbps, to form larger segment for 3 seconds based on manifest containing high complexity data. Hence, the invention encompasses that the user device [202] transceiver [202G] may first download the longer 5 second segment into playback buffer [202C]. Thereafter, the shorter 3 second segment may be downloaded by the user device [202] into the playback buffer [202C]. This allows the user device [202] transceiver [202G] a longer duration of time to download the second segment, which contains audio-visual data of high complexity.

The present invention further encompasses that a virtual manifest can also be created based on plurality of uniform segment sizes (e.g. 100 kb) in an event the detected scene complexity is low. The segmenter module [208C] combines segment of uniform size (say, 100 kb) to form larger segments of 500 kb containing low complexity data. In an event the detected scene complexity is high, the 100 kb segments may be combined to 200 or 300 kb segments based on the one or more first parameters and the one more second parameters. In another instance, in an event the detected scene complexity is high, the 100 kb segments may be delivered without combining.

In another instance, say the user device [202] is in a bad network area where efficiency of delivery of the content is poor, the manifest module [208B] transmits the low complexity data at a failsafe rendition. In contrast, the prior art mechanisms only provide creation of two segments of equal length (such as 4 seconds for a scene of 8 seconds) for playback on the user device [202]. Further, the prior art mechanism also does not take into account the complexity of the audio-visual data while encoding. Therefore, the invention encompasses that the steps 704-712 occur during configuration or may occur in background continuously at the content transmission server [208] (or content transmission encoding server [204]).

Figure 8:
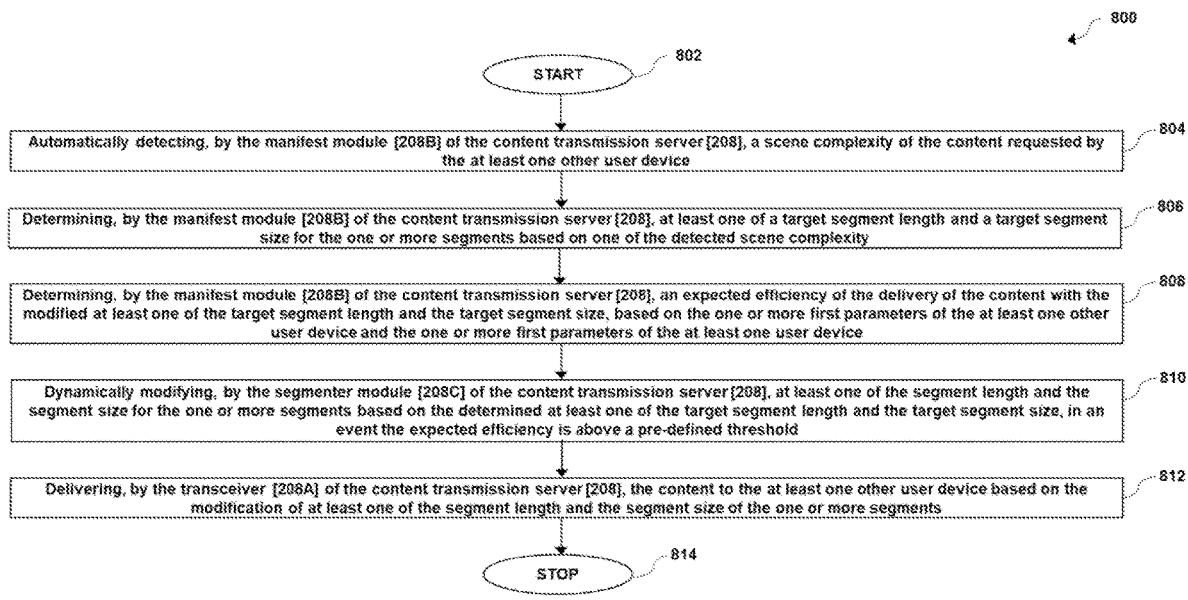
FIG. 8 illustrates another exemplary flow chart depicting a method for dynamic optimization of delivery of content in a wireless communication network system based on a detected scene complexity of the requested content, in accordance with exemplary embodiments of the present invention.

Referring to FIG. 8 illustrates an exemplary flow chart depicting a method for dynamic optimization of delivery of content in a wireless communication network system based on a detected scene complexity of the requested content, in accordance with the second embodiment of the present invention. The method [800] is a feature of the method [600] further comprising, at step [804], automatically detecting, by the manifest module [208B] of the content transmission server [208], a scene complexity of the content requested by the at least one other user device [202]. Next, at step [806], the manifest module [208B] of the content transmission server [208] determines at least one of the target segment length and the target segment size for the one or more segments based on one of the detected scene complexity.

Further, at step [808], the manifest module [208B] of the content transmission server [208] determines an expected efficiency of delivery of the content with modified at least one of the target segment length and the target segment size, based on the one or more first parameters of the at least one other user device [202] and the one or more first parameters of the at least one user device [202]. At step [810], the segmenter module [208C] of the content transmission server [208] dynamically modifies at least one of the segment length and the segment size for the one or more segments based on the determined the target segment length and the target segment size, in an event the expected efficiency is above a pre-defined threshold. At step [812], the manifest module [208B] of the content transmission server [208] delivers the content to the at least one user device [202] based on the modification of at least one of the segment length and the segment size of the one or more segments. The method [800] completes at step [814].

The method [800] further comprises extracting, by the segmenter module [208C] of the content transmission server [208], a stream of data associated with at least one target failsafe rendition of the one or more fail-safe renditions, in an event the expected efficiency is below a pre-defined threshold. The transceiver [208A] of the content transmission server [208] delivers the content to the at least one user device [202] based on the at least one target failsafe rendition.

In an exemplary embodiment, the manifest module [208B] may dynamically and virtually create a manifest to combine segments of length 1 second encoded at particular low bit rate such as, 3 mbps, to form larger segment for 5 seconds. This segment may contain audio-visual data of low complexity. The manifest module [208B] may then dynamically and virtually provide to combine the next segments of length 1 second encoded at high bit rate such as, 13 mbps, to form larger segment for 3 seconds based on the manifest. This segment may contain audio-visual data of high complexity. Accordingly, the segmenter module [208C] combines segments of length 1 second encoded at 3 mbps, to form larger segment for 5 seconds containing low complexity data. Thereafter, the segmenter module [208C] then forms the next subsequent segment by combining segments of length 1 second encoded at 13 mbps, to form larger segment for 3 seconds based on manifest containing high complexity data. Hence, the invention encompasses that the other user device [202] transceiver [202G] may first download the longer 5 second segment into playback buffer [202C]. Thereafter, the shorter 3 second segment may be downloaded by the other user device [202] into the playback buffer [202C]. This allows the other user device [202] transceiver [202G] a longer duration of time to download the second segment, which contains audio-visual data of high complexity.

The present invention further encompasses that a virtual manifest can also be created based on plurality of uniform segment sizes (e.g. 100 kb) in an event the detected scene complexity is low. The segmenter module [208C] combines segment of uniform size (say, 100 kb) to form larger segments of 500 kb containing low complexity data. In an event the detected scene complexity is high, the 100 kb segments may be combined to 200 or 300 kb segments based on the one or more first parameters and the one more second parameters. In another instance, in an event the detected scene complexity is high, the 100 kb segments may be delivered without combining.

In another instance, say the other user device [202] is in a bad network area where efficiency of delivery of the content is poor, the manifest module [208B] transmits the low complexity data at a failsafe rendition. In contrast, the prior art mechanisms only provide creation of two segments of equal length (such as 4 seconds for a scene of 8 seconds) for playback on the user device [202]. Further, the prior art mechanism also does not take into account the complexity of the audio-visual data while encoding. Therefore, the invention encompasses that the steps 704-712 occur during configuration or may occur in background continuously at the content transmission server [208] (or content transmission encoding server [204]).

Figure 9:
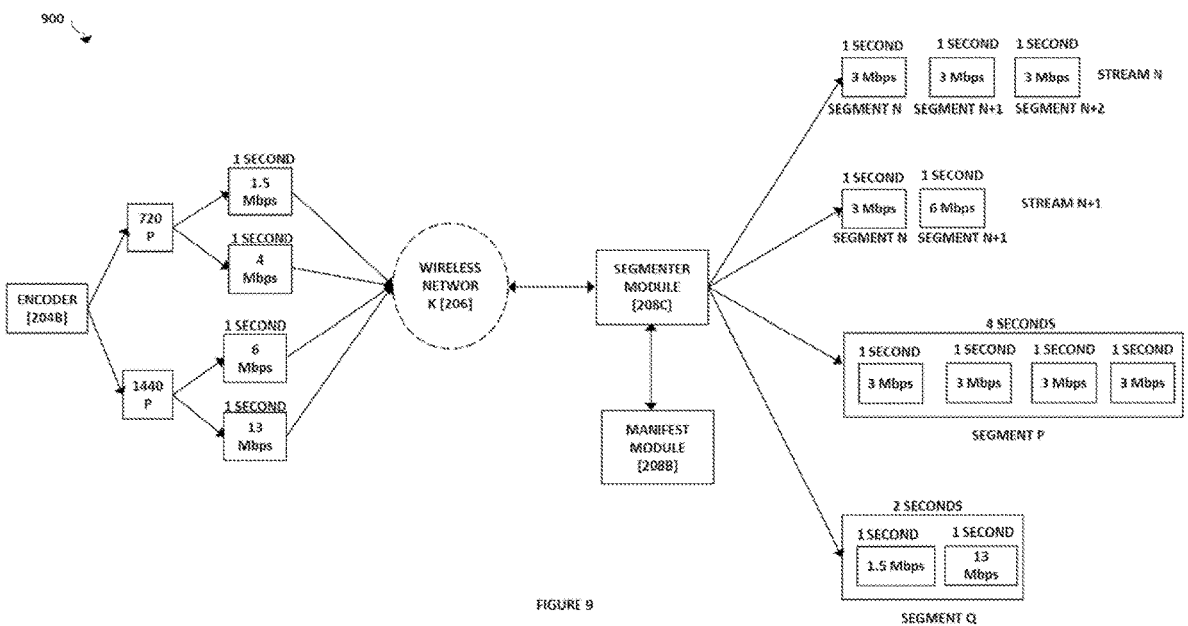
FIG. 9 illustrates an exemplary diagram illustrating formation of segments by the segmenter module [208C] based on a virtual manifest generated by the manifest module [208B] for dynamic optimization of delivery of content, in accordance with exemplary embodiments of the present invention.

Referring to FIG. 9 illustrates an exemplary diagram of formation of segments by the segmenter module [208C] based on a virtual manifest generated by the manifest module [208B] for dynamic optimization of delivery of content, in accordance with exemplary embodiments of the present invention. As shown in the figure, the encoder module [204B] of the content encoding server [204] encodes the audio-visual data in two resolutions such as a high resolution of 1440p resolution data and a low resolution of 720p resolution data, to account for changes in complexity of the data. The high resolution 1440p data can then be encoded at a bitrate of 6 mbps and 13 mbps. Further, the low resolution 720p data can be encoded at a bitrate of 1.5 mbps and 4 mbps. Accordingly, the encoder module [204B] creates segments of the data of uniform length, such as length of 1 second, encoded at the one or more bitrates. That is, the same data has 4 segments of 1 second each with bitrates 1.5 mbps, 4 mbps, 6 mbps and 13 mbps (as shown). As shown, the encoder [204B] may then transfer the uniform length encoded segments to the segmenter module [208C] of the content transmission server [208] via the wireless communication network [206].

Thereafter, upon receipt of the one or more parameters from the at least one user device [202] by the content transmission server [208], the manifest module [208B] of the content transmission server [208] dynamically creates a virtual manifest for transfer of the audio-visual data encoded at different bitrates. In one embodiment, the manifest module [208B] may dynamically and virtually create a manifest providing for combining of segments of length 1 second encoded at a particular bit rate to form a stream of data based on one of the one or more first parameters, the detected scene complexity and one or more failsafe renditions. Further, the segmenter module [208C] may dynamically and virtually combine the uniform size segments of 1 second encoded at different bit rates to form a stream of data to be transferred to the at least one user device [202]. As shown, based on the manifest created by the manifest module [208B], the segmenter module [208C] may create a stream [N] of data combining segments encoded at a particular bitrate for an audio-visual content. As shown in the figure, a stream [N] of data combining segments of length 1 second encoded at bitrate 3 mbps may be created by the segmenter module [208C] and a following stream [N+1] may contain segment [N] of 1 second length encoded at a bitrate of 3 mbps and another segment [N+1] of 1 second encoded at a bitrate of 6 mbps by the segmenter module [208C].

Further, the segmenter module [208C] is also configured to dynamically and virtually create a manifest providing to combine the segments of uniform size to form a larger segment of data to be transferred. As depicted in the figure, based on the manifest created, the segmenter module [208C] may combine 4 segments of uniform size 1 second, to form a larger segment [P] of 4 seconds in a stream of data, of bit rate 3 mbps. The segments [N, N+1, N+2] of length 4 seconds each may then be combined to form a stream of data (not shown). The invention also encompasses that the segmenter module [208C] may dynamically virtually combine the segments of length 1 second encoded at different bit rates to form a larger segment. As shown in the figure, based on the manifest created, the segmenter module [208C] may create a segment [Q] of length 2 seconds by combining segments encoded at 1.5 mbps a segment encoded at 13 mbps.

Figure 10:
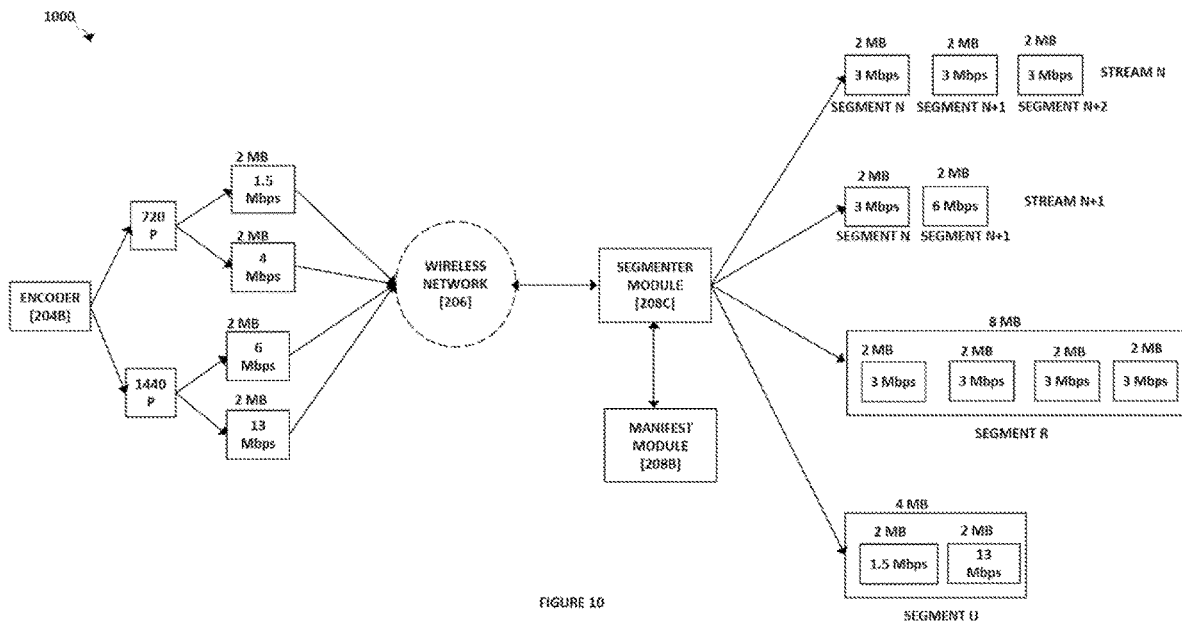
FIG. 10 illustrates another exemplary diagram illustrating formation of segments by the segmenter module [208C] based on a virtual manifest generated by the manifest module [208B] for dynamic optimization of delivery of content, in accordance with exemplary embodiments of the present invention.

Referring to FIG. 10 illustrates an exemplary diagram of formation of segments by the segmenter module [208C] based on a virtual manifest generated by the manifest module [208B] for dynamic optimization of delivery of content, in accordance with exemplary embodiments of the present invention. As shown in the figure, the encoder module [204B] of the content encoding server [204] encodes the audio-visual data in two resolutions such as a high resolution of 1440p resolution data and a low resolution of 720p resolution data, to account for changes in complexity of the data. The high resolution 1440p data can then be encoded at a bitrate of 6 mbps and 13 mbps. Further, the low resolution 720p data can be encoded at a bitrate of 1.5 mbps and 4 mbps. Accordingly, the encoder module [204B] creates segments of the data of uniform size, say 2 MB, encoded at the one or more bitrates. That is, the same data has 4 segments of 2 MB size each with bitrates 1.5 mbps, 4 mbps, 6 mbps and 13 mbps (as shown). As shown, the encoder [204B] may then transfer the uniform length encoded segments to the segmenter module [208C] of the content transmission server [208] via the wireless communication network [206].

Thereafter, upon receipt of the one or more parameters from the at least one user device [202] by the content transmission server [208], the manifest module [208B] of the content transmission server [208] dynamically creates a virtual manifest for transfer of the audio-visual data encoded at different bitrates. In one embodiment, the segmenter module [208C] may dynamically and virtually create a manifest providing for combining of segments of the size 2 MB each encoded at a particular bit rate to form a stream of data based on one of the one or more first parameters, the detected scene complexity and one or more failsafe renditions. Further, the segmenter module [208C] may dynamically and virtually combine the uniform size segments of 2 MB encoded at different bit rates to form a stream of data to be transferred. As shown, based on the manifest created by the manifest module [208B], the segmenter module [208C] may create a stream [N] of data combining segments encoded at a particular bitrate for an audio-visual content. As shown in the figure, a stream [N] of data combining segments of size 2 MB encoded at bitrate 3 mbps may be created by the segmenter module [208C] and a following stream [N+1] may contain segment [N] of size 2 MB encoded at a bitrate of 3 mbps and another segment [N+1] of size 2 MB encoded at a bitrate of 6 mbps by the segmenter module [208C].

Further, the segmenter module [208C] is also configured to dynamically and virtually create a manifest providing to combine the segments of uniform size to form a larger segment of data to be transferred. As depicted in the figure, based on the manifest created, the segmenter module [208C] may combine 4 segments of uniform size 2 MB, to form a larger segment [R] of 8 MB in a stream of data, of bit rate 3 mbps. The segments [N, N+1, N+2] of size 8 MB each may then be combined to form a stream of data (not shown). The invention also encompasses that the segmenter module [208C] may dynamically virtually combine the segments of the uniform size encoded at different bit rates to form a larger segment. As shown in the figure, based on the manifest created, the segmenter module [208C] may create a segment [U] of the size 4 MB by combining segments encoded at 1.5 mbps a segment encoded at 13 mbps.

Figure 11:
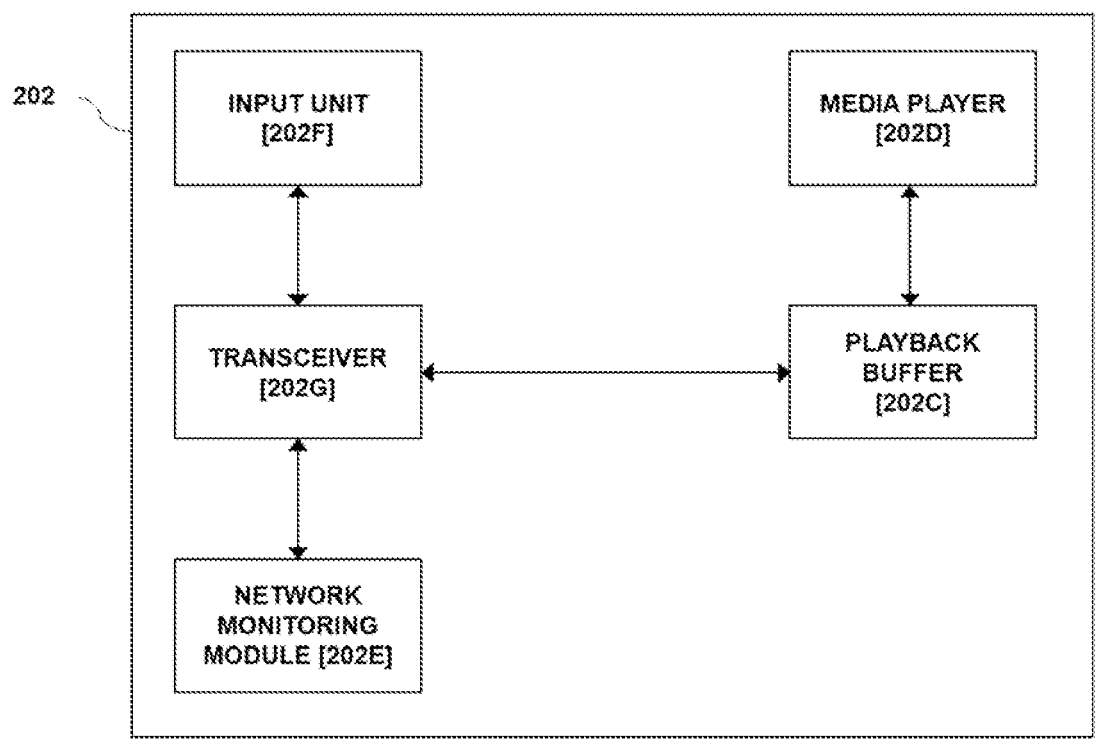
FIG. 11 illustrates an exemplary block diagram of a user device in a wireless communication network system configured to receive dynamically optimized content, in accordance with exemplary embodiments of the present invention.

Referring to FIG. 11 illustrates an exemplary block diagram of a user device [202] in a wireless communication network system configured to receive dynamically optimized content, in accordance with exemplary embodiments of the present invention. As depicted in the FIG. 10, the user device [202] comprises of an input unit [202F], a user device transceiver [202G], a playback buffer [202C], a media player [202D] and a network monitoring module [202e], a processor (not shown) and memory (not shown). It will be understood by those of ordinary skill in the art that the structure shown is merely illustrative and does not limit the structure of the user device [202]. The user device [202] may also include more or less components than those illustrated in FIG. 10 or have a different configuration than that illustrated in this FIG. 10.

The input unit [202F], connected to the user device transceiver [202G], the playback buffer [202C] and the media player [202D], is configured to receive an input from a user. It will be understood by those of ordinary skill in the art that the input unit [202F] and the user device transceiver [202G], the playback buffer [202C] and the media player [202D], may be connected to each other using universal asynchronous receiver/transmitter (UART), general purpose input output (GPIO), serial peripheral interface (SPI), inter-integrated Circuit (I2C), but not limited to the above standards. In some examples, the connection may only include a bus, and in other examples, the connection may also include other components, such as one or more controllers.

The input unit [202F] is configured to receive an input from the user to start the media player [202D]. In an embodiment, input received from the user may be to start a media player application, connected to user device transceiver [202G] and the playback buffer [202C], on the user device [202]. Further, the input unit [202F] is also configured to receive an input to play an audio-visual content on the media player [202D]. The invention encompasses that the input unit [202F] may comprise of a touch panel, a soft keypad, a hard keypad (including buttons) and the like. For example, the user may click a soft button on a touch panel of the input unit [202F] to play an audio-visual content using the media player [202D]. In another example, the user may touch an icon on the touch panel to start a media player application on a launcher of the user device [202]. In yet another example, the user may tap on a play icon on a touch panel using a finger to start the playback of a live cricket match on the media player [202D]. In another example, the user may tap on an option of play on the touch panel using a finger, in order to playback a video of a song on the media player [202D].

In a preferred embodiment, the input unit [202F] may be configured to receive an input from the user via a graphical user interface on the touch panel. As used herein, a "graphical user interface" may be a user interface that allows a user of the user device [202] to interact with the user device [202] through graphical icons and visual indicators, such as secondary notation, and any combination thereof. For example, the input unit [202F] may include a touch panel configured to collect the user's input via touch operation, thereon or near the surface of the touch panel, and using a finger or a stylus. The invention encompasses that the detection of the touch on a graphical user interface of the input unit [202F] can be realized by various types such as resistive, capacitive, infrared, and surface acoustic waves. The input unit [202F] is further configured to transmit the input received from the user to the user device transceiver [202G]. The input unit [202F] is also configured to transmit the input received to the media player [202D].

The user device transceiver [202G], connected to the input unit [202F] and the playback buffer [202B], is configured to transmit a request to playback an audio-visual content to the content transmission server [208] from the user device [202]. The user device transceiver [202G] is configured to transmit the request when an input is received from the user to play an audio-visual content. For example, when an input is received from the user to play a live cricket match on the media player [202D], the user device transceiver [202G] is configured to transmit a request to the content transmission server [208].

The user device transceiver [202G] is also configured to transmit the QoS information of the user device [202] to the content transmission server [208]. The invention encompasses that the user device transceiver [202G] is configured to receive the status of the network condition from the network monitoring module [202e] and transmit the status to the content transmission server [208]. For example, a status depicting availability of low bandwidth to the user device [202] may be transferred to the user device transceiver [202G] by the network monitoring module [202e]. The user device transceiver [202G] may then and transmit the status of low network to the content transmission server [208] using the wireless communication network [206].

The invention further encompasses that the user device transceiver [202G] is configured to receive the available storage space from the playback buffer [202C] and transmit the same to the content transmission server [208]. For example, the user device transceiver [202G] may receive that the space available for playback in the playback buffer [202C] is zero, then the user device transceiver [202G] may transmit the same to the content transmission server [208] to stop the receipt of the audio-visual stream of data.

The invention encompasses that the user device transceiver [202G] is further configured to receive the stream of audio-visual data from the content transmission server [208]. The stream of audio-visual data received from the content transmission server [208] is then transferred to the playback buffer [202C] by the user device transceiver [202G]. The invention encompasses that the user device transceiver [202G] is also configured to receive the virtual manifest created by the manifest module [208B] of the content transmission server [208]. The user device transceiver [202G] is configured to receive the stream of audio-visual data from the content transmission server [208] based on the virtual manifest created by the manifest module [208B] of the content transmission server [208].

The playback buffer [202C], connected to the user device transceiver [202G] and the media player [202D], is configured store the segments of the audio-visual stream of data received from content transmission server [208]. The playback buffer [202C] is also configured to transfer the segments of the audio-visual stream of data received from content transmission server [208] to the media player [202D] for playback on the user device [202]. For example, the segments of the live cricket match received from the content transmission server [208] are stored in the playback buffer [202C]. The audio-visual data of the segments is then transferred to the media player [202D] for playback on the user device [202].

The playback buffer [202C] is further configured to transfer a status of the space available in the playback buffer [202C] to the user device transceiver [202G]. The invention encompasses that the status of the space available in the playback buffer [202C] is used to form the QoS information of the user device [202] which is transmitted to the content transmission server [208].

The media player [202D], connected to the playback buffer [202C], is configured to playback the audio-visual data received from the content transmission server [208]. As used herein, the "media player [202D]" may be an application on the user device [202] which is capable to support streaming of audio-visual content from a content transmission server [208] and play it on the user device [202] in response to a request from the user. The media player [202D] is configured to receive the audio-visual data from the playback buffer [202C] for playback on the user device [102].

The network monitoring module [202e] is configured to dynamically and continuously determine a status of a wireless communication network connection on the user device [202]. As used herein, the "wireless communication network connection" is the connection of the user device [202] to the wireless communication network [206]. The status of the wireless communication network connection is configured to indicate the availability of bandwidth to the user device [202]. For example, a status of a wireless communication network connection on the user device [202] may indicate that a high bandwidth network such as a 4G network is available for the user device [202] to transfer and receive data. In another example, a status of a wireless communication network connection on the user device [202] may indicate that a low bandwidth network such as a 2G network is available for the user device [202] to transfer and receive data. The invention encompasses that the status of a wireless communication network connection on the user device [202] is configured to depict the volatile and changing wireless communication network connections of the user device [202].

The processor is configured to control the overall working of the user device [202]. The processor is also configured to control the operation of the input unit [202F], the user device transceiver [202G] and the media player [202D]. The processor is configured to provide for an interface for the transfer of data between the input unit [202F] and the media player [202D]. In an embodiment, the processor is configured to start a media player [202D] application when an input is received from the user via the input unit [202F]. The processor may start the media player [202D] based on one or more instructions stored in the memory. The processor may be further configured to provide for an interface between the playback buffer [202C] and the user device transceiver [202G]. The processor may be further configured to provide for an interface between the network monitoring unit [202e] and the user device transceiver [202G].

The memory is configured to store software programs, modules, data, information, instructions and the like. The memory is further configured to allow the processor to execute various functional disclosures and data processing by running software programs and modules stored in the memory. The memory may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof. In some embodiments, memory may further include memory remotely configured relative to processor which may be connected to the user device [202] and the processor via a network. Embodiments of such networks include, but are not limited to, the Internet, intranets, local area networks, mobile communication networks, and combinations thereof.

As evident from the above description, the present disclosure provides for a method and system for dynamically optimizing delivery of content in a wireless communication network. The invention provides for dynamically determining creating uniform size segments and combining them based on certain conditions of a user device while providing additional features for dynamically generating a virtual manifest to transfer streams of an audio-visual data to a user device based on the conditions of a user device and results in significant technical advancement over the prior art systems. The present invention in fact provides for transmission of streams of audio-visual data based without sacrificing the quality of the audio-visual data while reducing the volume of ingest in the wireless communication network. Further, the invention provides for producing audio-visual streams of data based on a virtual manifest that provides for a combination of segment lengths and bit rates to address volatile network conditions. Thus, the method of the present invention ensures maintaining a consistency in quality of the content delivered to the user device by dynamically modifying at least one of the segment length and the segment size based on the user device parameter, network parameter and scene complexity at the server content transmission server [208] itself so that a viewer watching the content on the medial player of the user device [202] doesn't experience any inconsistency in content quality. Further, the invention is compatibility with existing communication systems including, but not limiting to, the ABR streaming technique.

Although the invention is described herein to be implemented by the content encoding server [204] and the content transmission server [208], however, the present invention encompasses that the some or all of the inventive features of the invention may be implemented in the user device [202]. The present invention further encompasses that the some or all of the inventive features of the invention may be implemented in the network controller [206A], the content encoding server [204], the content transmission server [208], the user device [202] and/or a combination thereof.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for dynamically optimizing content delivery in a wireless communication network, the method comprising:
    receiving, at a transceiver of a content transmission server, a request for delivery of a content from at least one user device;
    determining, by a manifest module of the content transmission server, one or more first parameters for the at least one user device based on the received request;
    associating, by the manifest module of the content transmission server, the at least one user device with at least one cohort from a plurality of cohorts based on a comparison of the determined one or more first parameters with respective one or more second parameters of the plurality of cohorts, wherein cohorts in the plurality of cohorts include different one or more second parameters;
    dynamically identifying, by the manifest module of the content transmission server, a virtual manifest associated with the at least one cohort, wherein cohorts in the plurality of cohorts are associated with different virtual manifests;
    automatically extracting, by a segmenter module of the content transmission server, a stream of data associated with the identified virtual manifest, wherein the stream of data comprises of one or more segments;
    dynamically monitoring, by the manifest module of the content transmission server, one or more first parameters of the at least one user device;
    automatically modifying, by the segmenter module of the content transmission server, at least one of a segment length and a segment size for the one or more segments based on a change in the one or more first parameters; and
    delivering, by the transceiver of the content transmission server, the content to the at least one user device based on the extracted stream of data for dynamically optimizing content delivery in the wireless communication network, wherein the content is delivered to the at least one user device based on the modification of the at least one of the segment length and the segment size of the one or more segments.

2. The method as claimed in claim 1, wherein the dynamically identifying a virtual manifest associated with the at least one cohort by the manifest module of the content transmission server further comprises identifying one or more failsafe renditions, wherein the one or more failsafe renditions is determined based on the respective one or more second parameters of the at least one cohort.

3. The method as claimed in claim 2, wherein the segmenter module of the content transmission server automatically extracts a stream of data associated with the identified virtual manifest based on the one or more failsafe renditions.

4. The method as claimed in claim 2, the method further comprising:
    automatically detecting, by the manifest module of the content transmission server, a scene complexity of the requested content;
    determining, by the manifest module of the content transmission server, at least one of a target segment length and a target segment size for the one or more segments based on one of the detected scene complexity;
    determining, by the manifest module of the content transmission server, an expected efficiency of delivery of the content with modified at least one of the target segment length and the target segment size, based on the first parameters and the respective one or more second parameters of the at least one cohort;
    dynamically modifying, by the segmenter module of the content transmission server, at least one of a segment length and a segment size for the one or more segments based on the determined the target segment length and the target segment size, in an event the expected efficiency is above a pre-defined threshold; and
    delivering, by the transceiver of the content transmission server, the content to the at least one user device based on the modification of at least one of the segment length and the segment size of the one or more segments.

5. The method as claimed in claim 4, the method further comprising:
    extracting, by the segmenter module of the content transmission server, a stream of data associated with at least one target failsafe rendition of the one or more fail-safe renditions, in an event the expected efficiency is below a pre-defined threshold; and
    delivering, by the transceiver of the content transmission server, the content to the at least one user device based on the at least one target failsafe rendition.

6. The method as claimed in claim 1, wherein the request for delivery of the content is received from the at least one user device at the content transmission server via a media player of the at least one user device.

7. The method as claimed in claim 1, wherein the delivered content is displayed via a media player of the at least one user device.

8. The method as claimed in claim 1, wherein the one or more first parameters and the respective one or more second parameters of the at least one cohort comprise of at least one of a user device identifier, a playback buffer size, a playback buffer time, a network type, a bandwidth and a location.

9. A non-transient computer-readable medium comprising instructions for causing a computer to perform the method of:

receiving a request for delivery of a content from at least one user device;

determining one or more first parameters for the at least one user device based on the received request;

associating the at least one user device with at least one cohort from a plurality of cohorts based on a comparison of the determined one or more first parameters with one or more second parameters of the plurality of cohorts, wherein cohorts in the plurality of cohorts include different one or more second parameters;

dynamically identifying a virtual manifest associated with the at least one cohort, wherein cohorts in the plurality of cohorts are associated with different virtual manifests;

automatically extracting a stream of data associated with the identified virtual manifest, wherein the stream of data comprises of one or more segments;

dynamically monitoring one or more first parameters of the at least one user device;

automatically modifying at least one of a segment length and a segment size for the one or more segments based on a change in the one or more first parameters; and delivering the content to the at least one user device based on the extracted stream of data for dynamically optimizing content delivery in a wireless communication network, wherein the content is delivered to the at least one user device based on the modification of the at least one of the segment length and the segment size of the one or more segments.

10. A method for dynamically optimizing content delivery in a wireless communication network, the method comprising:

receiving, at a transceiver of a content transmission server, a request for delivery of a content from at least one user device;

determining, by a manifest module of the content transmission server, one or more first parameters for the at least one user device based on the received request;

dynamically creating, by the manifest module of the content transmission server, a new virtual manifest for the at least one user device, wherein:

the dynamically creating the new virtual manifest for the at least one user device further comprises comparing, by the manifest module of the content transmission server, the determined one or more first parameters of the at least one user device with respective one or more second parameters of at least one cohort from a plurality of cohorts, the new virtual manifest is created based on the comparison, wherein cohorts in the plurality of cohorts include different one or more second parameters, and the dynamically creating the new virtual manifest for the at least one user device by the manifest module of the content transmission server further comprises determining at least one of a segment length and a segment size of the one or more segments based on the one or more first parameters;

automatically generating, by a segmenter module of the content transmission server, a new stream of data for the requested content based on the new virtual manifest, wherein the new stream of data comprises of one or more segments; and delivering, by the transceiver of the content transmission server, the requested content to the at least one user device based on the generated new stream of data for dynamically optimizing content delivery in the wireless communication network.

11. The method as claimed in claim 10, the method further comprising:

receiving, at the transceiver of a content transmission server, a second request for delivery of a content from at least one other user device;

determining, by the manifest module of the content transmission server, one or more first parameters for the at least one other user device based on the received second request;

comparing, by the manifest module of the content transmission server, the determined one or more first parameters of the at least one other user device with the one or more first parameters of the at least one user device;

dynamically creating, by the manifest module of the content transmission server, a new cohort for the at least one user device and at least one other user device based on the comparison;

dynamically identifying, by the manifest module of the content transmission server, the new virtual manifest associated with the at least one user device;

automatically generating, by the segmenter module of the content transmission server, a new stream of data for the requested content based on the new virtual manifest, wherein the new stream of data comprises of one or more segments; and delivering, by the transceiver of the content transmission server, the requested content to the at least one other user device based on the generated new stream of data for dynamically optimizing content delivery in the wireless communication network.

12. The method as claimed in claim 10, wherein the manifest module of the content transmission server creates the new virtual manifest for the at least one user device in an event the one or more first parameters of the at least one user device does not match the respective one or more second parameters of the at least one cohort.

13. The method as claimed in claim 10, wherein the segmenter module of the content transmission server automatically generates the new stream of data for the requested content based on the determined at least one of the segment length and the segment size.

14. The method as claimed in claim 10, wherein the dynamically creating the new virtual manifest based on the determined one or more first parameters further comprises determining one or more failsafe renditions for the new virtual manifest, wherein the one or more failsafe renditions is determined based on the one or more first parameters.

15. The method as claimed in claim 14, wherein the segmenter module of the content transmission server automatically generates the new stream of data for the requested content based on the one or more failsafe renditions.

16. The method as claimed in claim 14, the method further comprising:

automatically detecting, by the manifest module of the content transmission server, a scene complexity of the requested content;

dynamically modifying, by the segmenter module of the content transmission server, at least one of the segment length and the segment size for the one or more segments based on one of the detected scene complexity and the one or more failsafe renditions, wherein the content is delivered to the at least one user device based on the modification of the at least one of the segment length and the segment size of the one or more segments.

17. The method as claimed in claim 11, the method further comprising:
automatically detecting, by the manifest module of the content transmission server, a scene complexity of the content requested by the at least one other user device;
determining, by the manifest module of the content transmission server, at least one of a target segment length and a target segment size for the one or more segments based on one of the detected scene complexity;
determining, by the manifest module of the content transmission server, an expected efficiency of the delivery of the content with the modified at least one of the target segment length and the target segment size, based on the one or more first parameters of the at least one other user device and the one or more first parameters of the at least one user device;
dynamically modifying, by the segmenter module of the content transmission server, at least one of the segment length and the segment size for the one or more segments based on the determined at least one of the target segment length and the target segment size, in an event the expected efficiency is above a pre-defined threshold;
delivering, by the transceiver of the content transmission server, the content to the at least one other user device based on the modification of at least one of the segment length and the segment size of the one or more segments.

18. The method as claimed in claim 17, the method further comprising:
extracting, by the segmenter module of the content transmission server, a stream of data associated with at least one target failsafe rendition of the one or more fail-safe renditions, in an event the expected efficiency is below a pre-defined threshold; and
delivering the content to the at least one other user device based on the at least one target failsafe rendition.

19. The method as claimed in claim 10, the method further comprising:
dynamically monitoring, by the manifest module of the content transmission server, the one or more first parameters of the at least one user device; and
automatically modifying, by the segmenter module of the content transmission server, at least one of a segment length and a segment size for the one or more segments based on a change in the one or more first parameters.

20. The method as claimed in claim 10, wherein different virtual manifests are created for cohorts in the plurality of cohorts.

21. A non-transient computer-readable medium comprising instructions for causing a computer to perform the method of:
receiving a request for delivery of a content from at least one user device;
determining one or more first parameters for the at least one user device based on the received request;
dynamically creating a new virtual manifest for the at least one user device, wherein:
the dynamically creating the new virtual manifest for the at least one user device further comprises comparing the determined one or more first parameters of the at least one user device with respective one or more second parameters of at least one cohort from a plurality of cohorts,
the new virtual manifest is created based on the comparison,
cohorts in the plurality of cohorts include different one or more second parameters, and
the dynamically creating the new virtual manifest for the at least one user device further comprises determining at least one of a segment length and a segment size of the one or more segments based on the one or more first parameters;
automatically generating a new stream of data for the requested content based on the new virtual manifest, wherein the new stream of data comprises of one or more segments; and
delivering the requested content to the at least one user device based on the generated new stream of data for dynamically optimizing content delivery in a wireless communication network.

\* \* \* \* \*